US012801877B2

(12) United States Patent
Grimaud

(10) Patent No.: US 12,801,877 B2
(45) Date of Patent: Nov. 17, 2026

(54) ENSURING REMOTE ACCESS BY A WORKER TO A CORRECT TWO-DIMENSIONAL (2D) DRAWING

(71) Applicant: Dassault Systemes SolidWorks Corporation, Waltham, MA (US)

(72) Inventor: Jean-Jacques Grimaud, Winchester, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 0 days.

(21) Appl. No.: 18/918,572

(22) Filed: Oct. 17, 2024

(65) Prior Publication Data

US 2025/0131218 A1 Apr. 24, 2025

Related U.S. Application Data

(60) Provisional application No. 63/592,228, filed on Oct. 23, 2023.

(51) Int. Cl.
*G06K 7/14* (2006.01)

(52) U.S. Cl.
CPC .................................. *G06K 7/1417* (2013.01)

(58) Field of Classification Search
CPC .. G06K 7/1408; G06K 7/1413; G06K 7/1417; H04N 1/32133; H04N 2201/3269; G06F 16/93; G06F 16/9554
See application file for complete search history.

(56) References Cited

U.S. PATENT DOCUMENTS

| | | | | |
|---|---|---|---|---|
| 8,797,603 | B1 | 8/2014 | Dougherty | |
| 11,593,580 | B1 * | 2/2023 | Harper | G06K 7/1417 |
| 2006/0282761 | A1 * | 12/2006 | Pierce | G06F 40/197 715/210 |
| 2010/0097661 | A1 | 4/2010 | Hoblit | |
| 2011/0295936 | A1 * | 12/2011 | Gill | G06F 16/954 709/203 |

(Continued)

FOREIGN PATENT DOCUMENTS

JP 2014056556 3/2014

OTHER PUBLICATIONS

European Search Report for 24208446.5 dated Feb. 4, 2025.

(Continued)

*Primary Examiner* — Laura A Gudorf

(74) *Attorney, Agent, or Firm* — Sheehan Phinney Bass & Green PA

(57) ABSTRACT

A computer-based method includes reading a non-alphanumeric (e.g., QR or quick response) code from a document that includes substantive information subject to change over time with a code reader of a smart device. The code includes a document identifier that identifies the document and a version indicator associated with the document, and a uniform resource locator for a remote network location where information about the document and any versions is stored. A request is initiated, from the smart device, to check at the remote network location whether the version of the document at issue is a particular version of the document (e.g., the latest version of the document). The smart device receives a response and produces a notification on its display screen indicating whether the document is the particular (or latest) version of the document.

22 Claims, 8 Drawing Sheets

(56) References Cited

U.S. PATENT DOCUMENTS

| | | | | |
|---|---|---|---|---|
| 2017/0249348 | A1 * | 8/2017 | Souder ................ | G06F 16/2474 |
| 2018/0314743 | A1 * | 11/2018 | Hamilton, II ....... | G06F 16/2474 |
| 2020/0151702 | A1 * | 5/2020 | Sinha ................. | G06Q 20/3224 |
| 2021/0382958 | A1 * | 12/2021 | Fowler ............... | G06K 7/10297 |

OTHER PUBLICATIONS

Youtube, GstarCAD2020—Express tools—QRcode; https://www.youtube.com/watch?v=Xtv0K4e5khw; Dec. 26, 2019.

Youtube ; ARES CAD Software by Graebert; QR Codes in DWG Drawings to Improve Collaboration and Sharing with ARES Commander; https://www.youtube.com/watch?v=OLiGYR44k44 Apr. 2024.

* cited by examiner

Creating a lookup table for the GIS and data files contained in the repository of the project or geographical area
The contents are first ordered by Main Format, and their associated files, if any.
Then, within a Main Format, they are ordered alphabetically (from A to Z) by Type of Map using their Map Symbol
The next step is to order them by version and Date.

| Location: | Miami, FL | | | | | | | |
|---|---|---|---|---|---|---|---|---|
| Geographical: | North East Miami | | | | | | | |
| | QR Code Contents<br>Concatenated BaseName_Version_Date_Format Extension | Frequent Main Formats | Format Extension | Associated Files | F= Frequent C=Common | Type of Map | Map Symbol | |
| | | Shapefile | .shp | | | | | |
| | | | .shx | Shape Index File | F | Admin/Political Boundaries | BND | |
| | | | .dbf | dBase Attribute File | F | Census Data | CENSUS | |
| | | | .prj | Projection File | C | Cultural (Historical sites, Monuments...) | CULT | |
| | | | .shp.xml | Additional data | C | Digital Elevation Model | DEM | |
| | | | .sbn | Queries with ArcGIS | C | Earthquake Zones | EQZ | |
| | | | .sbx | Queries with ArcGIS | C | Hydrology (rivers, lakes, etc.) | HYDRO | |
| | | Keyhole Markup Language | .kml | Style Layers/Features | | Land Use | LU | |
| | | Web Map Services layers | | Managed from server | | Land parcels and ownership | PARCEL | |
| | | Vector data | GeoJSON | | | Population | POP | |
| | | Esri File Geodatabase | GDB | | | Railroad networks | RAIL | |
| | | Grid-cell data (raster data) | .tif | datatype, resolution,... | | Soil Types or Soil Characteristics | SOIL | |
| | | | | | | Transportation Network | TN | |
| | | | | | | Topography | TOPO | |
| | | | | | | Utilities (power lines, optical fiber, etc.) | UTIL | |
| | | | | | | Vegetation | VEG | |
| | | | | | | Zoning Areas | ZONING | |
| | MiamiWinwood_TN_1000_B_2020-02-25_.shp | Shapefile | .shp | | TN | Transportation Network | | |
| | MiamiWinwood_TN_1000_B_2020-02-25_.shx | Shape Index File | .shx | | TN | Transportation Network | | |
| | MiamiWinwood_TN_1000_B_2020-02-25_.dbf | dBase Attribute File | .dbf | | TN | Transportation Network | | |
| | MiamiWinwood_TN_1000_C_2023-06-14_.shp | Shapefile | .shp | | TN | Transportation Network | | |
| | MiamiWinwood_TN_1000_C_2023-06-14_.shx | Shape Index File | .shx | | TN | Transportation Network | | |
| | MiamiWinwood_TN_1000_C_2023-06-14_.dbf | dBase Attribute File | .dbf | | TN | Transportation Network | | |

FIG. 7

ENSURING REMOTE ACCESS BY A WORKER TO A CORRECT TWO-DIMENSIONAL (2D) DRAWING

CROSS-REFERENCE TO RELATED APPLICATION(S)

The present application claims the benefit of priority to U.S. Provisional Patent Application No. 63/592,228, entitled Ensuring Remote Access by a Worker to a Correct Two-Dimensional (2D) Drawing, which was filed on Oct. 23, 2023. The disclosure in the prior application is incorporated by reference herein in its entirety.

FIELD OF THE INVENTION

This disclosure relates to the field of computer-implemented design and modeling, and more particularly, relates to ensuring access to a correct (e.g., a latest version of) a two-dimensional (2D) drawing.

BACKGROUND

Computers are widely used to design and store various types of documents, such as computer-aided design (CAD) drawings and models, and geographic information systems (GIS) maps and related data files. These documents, which are usually subject to change over time, may be used by an end user (e.g., a human worker in the field) to perform any number of tasks related to manufacturing, construction, production, etc. It can be critical to ensure that the end user has access to and works from the correct (e.g., latest) version of the document. As such, one question often asked by such end users before starting a task is whether this printed (or electronic) document the end user is looking at is the correct (or latest) version of the document. Finding the answer to this question has proven to be challenging.

SUMMARY OF THE INVENTION

In one aspect, a computer-based method includes reading a non-alphanumeric (e.g., QR or quick response) code from a document that includes substantive information subject to change over time with a code reader of a smart device. The code includes a document identifier that identifies the document and a version indicator associated with the document, and a uniform resource locator for a remote network location where information about the document and any versions is stored. A request is initiated, from the smart device, to check at the remote network location whether the version of the document at issue is a particular version of the document (e.g., the latest version of the document). The smart device receives a response and produces a notification on its display screen indicating whether the document is the particular (or latest) version of the document.

Various implementations identify a single document and/or packets of 2D documents. In this regard, each single 2D document may contain all the information needed to be interpreted to instruct or document a task while the 2D documents of a packet may need to be interpreted concurrently to instruct or document a task.

In some implementations, one or more of the following advantages are present.

For example, in various implementations, the systems and methods disclosed herein help end users confirm that a printed (or electronic) document (e.g., drawing or GIS map and related data files) the end user is looking at is indeed the correct (or latest) version of the document. The end user is able to accomplish this easily and conveniently. The systems and techniques generally apply to many different entities including, for example, products, assets, buildings, structures, as well as large infrastructures and maps, in particular networks, etc. In various implementations, the systems and techniques may apply to a 2D drawing on paper (or other physical substrates) as well as digital files that contain the 2D drawing (viewable, for example, on a display screen of a smartphone). The systems and techniques may apply to facilitate version tracking throughout the lifecycle of a document, from cradle to grave, including any and all iterations or revisions thereof.

In various implementations, the systems and techniques disclosed herein help avoid errors that may arise from using an incorrect rasterized 2D drawing and consequently implementing a wrong design. These errors would generally otherwise need to be corrected later through rework or during internal testing or commissioning. Some of the errors could require removals or reworking of tasks that were implemented after the incorrect one. This may create potential resupply requests and exacerbate delays for many subtasks involved.

The systems and techniques disclosed herein generally create a logical link back to the revisions of the 2D CAD drawing in the repository, providing either a "MasterFile" sort of repository (e.g., when data has been replicated on different servers), or on a single "Source of Truth" type repository. The systems and techniques typically facilitate synchronizing rasterized 2D drawings before use with each revision of the 2D CAD drawing, or alternatively, generating on the fly rasterized 2D drawings from newly revised 2D CAD drawings.

The systems and techniques help eliminate time spent searching among servers, and elsewhere, for a "Masterfile" in order to confirm access to a correct rasterized 2D drawing. Moreover, the systems and techniques help eliminate time spent by the worker in figuring out how to find out which is the latest version of the rasterized 2D drawing that he or she should use for a task or project. Additionally, the systems and techniques disclosed herein may help ensure that the worker receives the correct version of the rasterized 2D drawing.

Use of the systems and techniques disclosed herein will tend to generate trust in the system by the user. Moreover, implementing the systems and techniques disclosed herein may improve agility and productivity during the life of a project involving collaborative design, tasks outsourced to suppliers, execution/build, commissioning, maintenance, renovation, and/or dismantlement, etc.

QR codes are convenient to use because they are public and do not generally require a license. QR code detectors and readers are already incorporated in many consumer devices and are part of the free in-apps included in the purchase of the device. Additionally, QR code generators are already included in some consumer products (and are generally accessible by any products). More complex ones can automatically serialize QR codes and are available. Scripts can also be used in conjunction with existing libraries to generate serial codes from an Excel™ spreadsheet, for example.

Additionally, one of the problems that the systems and techniques disclosed herein may address is to help users (e.g., construction workers) in the field easily confirm that they are working from the latest set of drawings for a particular project. In this regard, the application discloses the notion of applying a QR code to a drawing where the QR code includes a link to a network location that includes information about versions of the drawing. The QR code can be scanned in the field (e.g., with the user's mobile device) to access the stored information to determine whether the drawing being used is in fact the correct (e.g., latest, and most up to date) version of the drawing. In some instances, if the system determines that the scanned drawing is not completely up to date, then the system may enable the user to access or download the latest up to date version.

Other features and advantages will be apparent from the description and drawings, and from the claims.

BRIEF DESCRIPTION OF THE DRAWINGS

FIG. 7 is an example of a lookup table for GIS maps that may be stored in computer memory.

Like reference characters refer to like elements.

DETAILED DESCRIPTION

Figure 1:
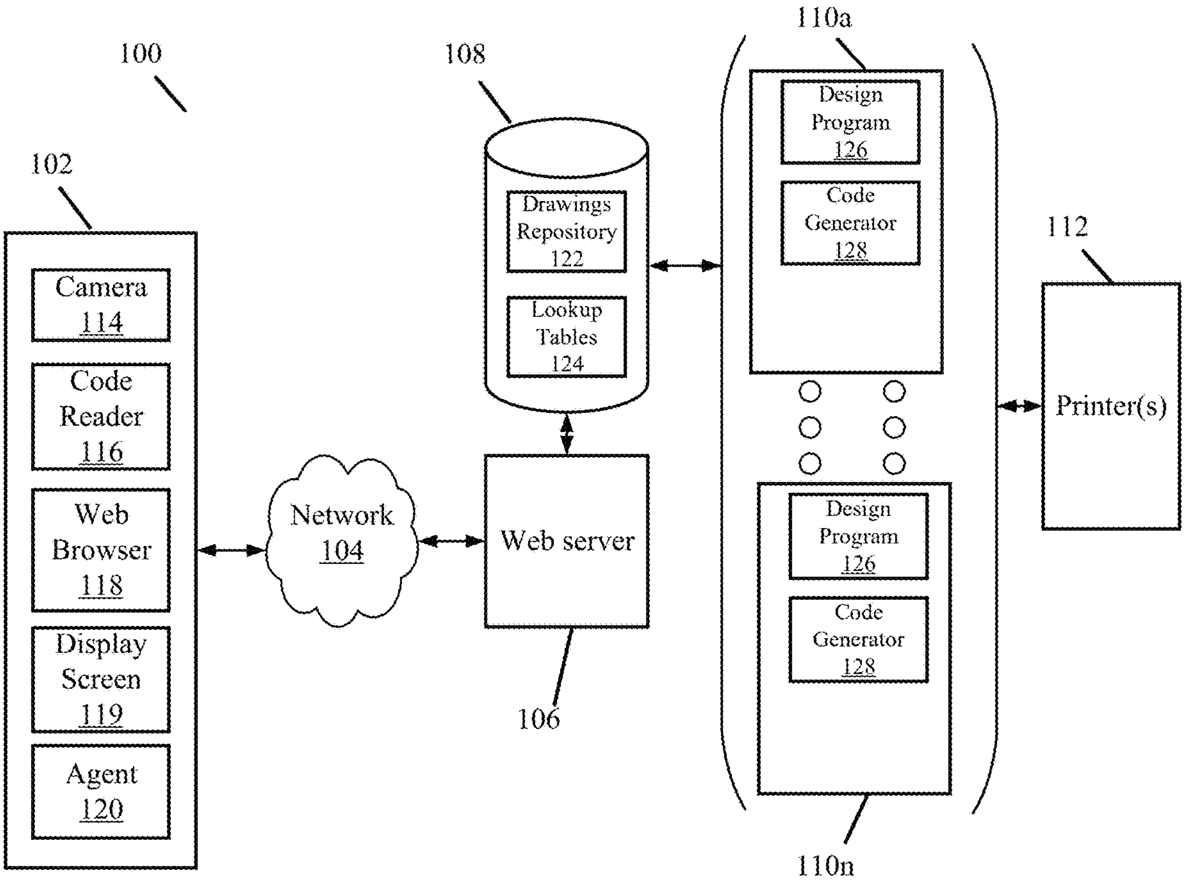
FIG. 1 is a schematic representation of an example of a computer system for implementing and facilitating the techniques disclosed herein.

This document uses a variety of terminology to describe its inventive concepts. This terminology should be given its ordinary meaning and, unless otherwise indicated, may be understood as having meanings that are consistent with what follows.

For example, computer-aided design (CAD) software is software that, when executed on a computer, enables a user of the computer to perform design functionalities (e.g., to design products, objects, assemblies, etc.). In certain implementations, CAD software allows a user to construct and manipulate complex three-dimensional (3D) models. Solidworks® computer software, Catia® computer software, and DraftSight® computer software, each of which is available from Dassault Systèmes SolidWorks Corporation, the applicant of the current application, are examples of CAD software that may be used, for example, to construct and manipulate complex three-dimensional (3D) models. A "designer" is a typical user of a 3D CAD system. More specifically, in a typical implementation, a "designer" is a human document creator and/or a member of the team supporting document creation—e.g., a CAD designer, or member of design team (e.g., manager, administrator, etc.). The designer typically designs physical and aesthetic aspects of 3D models and may be skilled in 3D modeling techniques. The designer typically creates parts and may assemble certain parts into a subassembly. A subassembly may also consist of other subassemblies. An assembly may be designed using parts and subassemblies. Parts and subassemblies may be collectively referred to as components. The phrase "designer" used herein should be construed broadly to include any one or more human users of a computer or computer system to create a design. The design may be for virtually any real-world product that may be manufactured, assembled, constructed, etc. by a human. The 3D design is typically followed by one or more 2D drawings. They are used in most of the subsequent operations for examples manufacturing, construction, commissioning, installation, maintenance, renovation, performance enhancements, etc. during the whole life of the design.

The geographic information system (GIS) is a system that may be implemented at least in part with computers, that can be used to create, review, manage, analyze, and map many different types of data. A GIS map connects data from one or more related data files to a geographic map, integrating location data with types of descriptive information. GIS maps help users understand patterns and relationships within a geographic context.

A QR (quick-response) code is a two-dimensional, non-alphanumeric, machine-readable optical image that contains encoded information specific to a labelled item (e.g., a document, such as a drawing or GIS map). A QR code may contain data for a locator, an identifier, and a uniform resource locator (associated with a web destination where information associated with versioning data specific to the labelled item is stored). In a typical implementation, a QR code consists of black squares arranged in a square grid on a white background, including fiducial markers that can be read by an imaging device such as a camera, and processed until the image can be appropriately interpreted. The required data is then extracted from patterns that are usually present in both horizontal and vertical components of the image. A QR code URL is a type of QR code that contains a uniform resource locator (i.e., an address of a website). Typically, a user can scan (or otherwise capture) a QR code URL with a smartphone (or any kind of smart device, including tablet) and access the corresponding URL link without having to manually enter (i.e., type) the URL into the smartphone's browser.

In a typical implementation, a lookup table is an array or matrix of data stored in computer memory in a manner that is searchable.

Rasterization refers to a computer-implemented process of converting a computer image described in a vector graphics format for example into a raster image (e.g., a series of pixels, dots, or lines, which, when displayed together, create the image that was represented via shapes). The rasterized image may then be displayed on a computer display, or printed, or stored, for example, in a bitmap file format. In some implementations, a "2D rasterized drawing" or a "2D drawing" has a format that stores CAD entities and their properties, such as dimensions, layers, and annotations, using geometric primitives such as point, lines, curves. The format is scalable and editable. Examples of 2D drawings include DXF, DWG, DWF, SVG and Adobe Illustrator, and may sometimes be referred to as "vector" drawings. Moreover, a "2D rasterized drawing" format uses rasterized images which are resolution-dependent. The abilities of 2D rasterized drawings are limited to some edits such as cropping and contrast setting, but they can be annotated. For an identical view from the user, a 2D rasterized drawing file size is a more compact format than the vector graphic file size from which it was issued.

An "end user," as the phrase is used herein, refers to a human, typically in "the field" whose role it is to use a document (e.g., drawing or GIS map) typically created by someone else (i.e., the designer). Examples of end users include contractors, manufacturers, production people, installers, maintenance personnel, etc.

A "smart device" is an electronic device that is generally able to connect to other devices or networks via one or more wireless protocols, such as Bluetooth, Zigbee, near-field communication, Wi-Fi, NearLink, LiFi, or 5G that can operate typically interactively and autonomously. Examples of smart devices include smartphones, smart tablets, smart phablets, etc.

As used herein, "metadata" refers to data (e.g., certain types of data that provides information about other data). In the context of a document, "metadata" may refer to the title of the document, revision information for the document (including a revision number, letter, character, or other identifier), date of the drawing, QR code contents, plane level identifiers, drawing type identifier, applicable trade identifiers, elevation identifier, and other project- or map-specific information, such as a site identifier, an asset identifier, location and other geographical location identifiers, permitting information, main format identifiers, format extensions, names and/or other metadata for associated files, frequent or common identifiers, map type identifiers, map symbol identifiers, etc.

The phrase "processor" (or the like refers) to any one or more computer-based processing devices. A computer-based processing device is a physical component (e.g., a CPU) that can perform computer functionalities by executing computer-readable instructions stored in memory. If there is more than one computer-based processing device or processor cores, they can be contained in a single physical device (e.g., in a single a computer or server) or distributed across multiple physical devices that may be located, for example, in more than one physical location or facility.

The phrase "memory" (or the like) refers to any one or more computer-based memory devices. A computer-based memory device is a physical component that can store computer-readable instructions that, when executed by a processor, results in the processor performing associated computer functionalities. If there is more than one computer-based memory device, they can be contained in a single physical device (e.g., a computer or server) or distributed across multiple physical devices that may be in more than one physical location or facility.

Prior Technologies are Distinct.

Prior technologies exist. However, each of these prior technologies has shortcomings that may be addressed, for example, by one or more implementations of the systems and techniques disclosed herein.

For example, certain organizations utilize information technology (IT) stratification of business processes by layers. More specifically, in some IT environments, business processes have been implemented sequentially one on top of the other. In those environments, some data repositories containing 2D CAD drawings and rasterized 2D drawings have been replicated on different servers for different business processes. In such instances, the "Masterfile" may be the one used by the initial business process. It maintains the update through each run of the business process. Unfortunately, data entities on other servers replicating these data entities are often not properly synchronized. Synchronization between the "Masterfile" on the original server may be made, if at all, periodically (e.g., on a weekly or monthly schedule), or even not at all through a schedule, but on demand, which also requires waiting times. Requesters spend efforts and time searching for the "MasterFile" to respond to the question of the user.

In some implementations, team member may be provided with access to a single source of truth. More specifically, in some IT environments, there is a single repository over which all business processes are running. It constitutes a "single source of truth" but it is sometimes not easy for the worker to access it through filters, keywords, and defined queries such as SQL, even using a smartphone or a tablet.

In various implementations, the systems and techniques disclosed herein (in contrast to the prior systems) provide technical solutions to these, and potentially other, technical limitations/problems in prior CAD software.

Technical Disclosure

FIG. 1 is a schematic representation of an exemplary computer system 100 configured to implement techniques disclosed herein. More specifically, in a particular implementation, the illustrated computer system 100 is configured to enable a human user to use his or her smartphone to check whether a particular physical document, such as a drawing on paper showing a construction plan or a geographic information system (GIS) map for example (which is subject to being revised from time to time) is the latest version (or some other specified version/revision) of that document. In a particular exemplary implementation, the user (see below) takes a photo of (or otherwise captures), with his or her smartphone, a QR code that is printed on or otherwise visually applied to the physical version of the document, the system will recognize that it is a QR code and will scan it, and the system 100, in response to the scanning, confirms whether the physical document is the latest (i.e., most up-to-date) version of that document, or if subsequent iterations (revisions) of the document are available. Typically, the smart device 102 recognizes the QR code locally. The image could be sent to the system 100 by placing the scan reader in a subsequent step in the process which is also possible. Metadata (e.g., transmitted from the smart device) includes an image if the scan reading is not done locally by the smart device. Typically, if the system determines that the physical version of the document is not the latest version of the document (i.e., subsequent versions or revisions of the document exist in the system), then the system 100 may make the latest version of the document available, in electronic form, for viewing on a display screen of the user's smartphone.

The system 100 in FIG. 1 includes the user's smart device (e.g., smart phone 102), which is connected, via a network 104, to a web server 106, which has access to computer memory 108 that is connected to able to receive and store data (e.g., in the form of documents and related metadata) from one or more computer workstations 110*a* . . . 110*n* that are themselves connected to one or more printers 112. The physical and organizational configuration of the illustrated system components can vary. In an exemplary implementation, the one or more computer workstations 110*a*-110*n* and the one or more printers 112 may be located in one physical facility or distributed across multiple physical facilities but subject to control and/or access limitations imposed by a single legal entity (e.g., a single company, enterprise, or other organization). The web server 106 and/or the computer memory 108 may be located at any one or more of the physical facilities where one or more of the computer workstation(s) 110*a*-110*n* or the printer(s) 112 are located or in any other physical facility or facilities and may be subject to control and/or access limitations imposed by the same as the computer workstation(s) 110_a_-110_n_ and/or the printer(s) 112 or by a different legal entity. Regardless, the illustrated system components are configured to communicate and interact with one another to perform and/or facilitate the functionalities described herein as being attributable to the system 100.

The computer workstations 110_a_-110_n_ can have various different configurations, but each one is generally configured to perform the functionalities described herein as being attributable to a computer workstation. In a typical implementation, each computer workstation 110_a_-110_n_ is configured to enable human designers to create, edit, print, and/or save one or more documents (e.g., drawings, GIS maps, etc.). Moreover, in a typical implementation, each computer workstation 110_a_ . . . 110_n_ is further configured to enable designers to use the computer workstation 110_a_ . . . 110_n_ to generate and apply a unique visual code (e.g., a quick response or "QR" code) to each respective one of the documents, at some point during the document's life cycle. As an example, in some implementations, the system 100 applies a unique QR code to a document in response to some prompt from the designer, which the designer may do, for example, if the designer deems the document to be completed (e.g., ready for use by an end user in a real world construction project, etc.). The computer system 100 applies a unique QR code to a drawing when the system 100, in responses to the prompt from the user. The system may then print and/or save (e.g., a rasterized version of) the document.

Typically, the system 100 is configured so as to apply a different unique code (e.g., a QR code) to every document, including every version (or revision) of a particular document. For example, the system 100 may apply a first unique QR code to an original version of a document, then apply a second unique QR code (different than the first unique QR code) to a subsequently revised version of that drawing, and then apply a different unique QR code to every single subsequent version (revision) of that drawing produced on and/or saved in the system. Every unique code (e.g., QR code) generated by the system 100 typically represents, and, therefore, may be generated by inputting to one of the code generators 128, information that identifies a uniform resource locator (URL) for a website where an electronic version of the document will be stored for remote access (e.g., from a user's smart phone (e.g., 102). Additionally, in some implementations, the QR code may represent (and be generated using as an input) information about the document to which the QR code is being applied. For a particular document, this information may include, for example, the document's title, the document's revision number, and/or the document's date.

In view of the foregoing, each computer workstation 110_a_-110_n_ in the illustrated implementation has, or has access to, a design program 126 and a code generator 128. Of course, in various implementations, the computer workstations may include various other components, software, hardware, or a combination thereof, as well. In addition, each computer workstations 110_a_-110_n_ in the illustrated implementation is connected to and able to print to one or more printers 112 that are configured to print (e.g., on paper or other physical substrate) real-world versions of in-process documents or completed documents. In some cases, a 2D drawing has to be interpreted in conjunction with other drawings or information such as notes, schedules, details, in order to be interpreted correctly by the user in the field. In these cases, the 2D drawings may be organized in a packet to ensure the proper interpretation by the user.

The design program 126 can be virtually any form of software (e.g., CAD software, etc.) that, when executed by a computer processor for example, enables a user to perform design functionalities to create, for example, virtual 2D or 3D models of real-world objects to be produced, manufactured, constructed, and/or virtual GIS maps or the like. The resulting models/maps, for example, may be rasterized for example, and printed (at one or more of the printers 112) as a document for use by an end user in one or more real world applications. Possible real world applications include producing, manufacturing, and constructing one or more real-world objects using the substantive contents in a corresponding one or more of the printed documents as a guide, and/or otherwise using the one or more printed documents for other real-world, non-virtual applications (e.g., ones involving a document showing a GIS map). Examples of CAD software that may be the (or part of the) design program 126 include Solidworks® computer software, Catia® computer software, and DraftSight® computer software.

The code generator 128 is a computer application (e.g., software executing on computer hardware that includes a processor) that is able to generate a QR code based on input data and typically in response to a prompt from a user. The input data—that the user may provide or that the system 100 may pull from the appropriate sources and apply—to the code generator 128 can include, for example, any data that would cause the code generator 128 to produce a QR code, that, when read, would direct a web browser (e.g., 118) on a smartphone (e.g., 102) to a web server (e.g., 106) to access data relating to the corresponding document and/or revisions thereof. The input data may include, for example, an associated URL and, optionally, drawing identifying information (e.g., document name, document revision number, and/or document date, etc.) for the document to which the QR code has been or will be applied.

Each computer workstation 110_a_, 110_n_ is able to access and send print instructions to one or more printers 112. The printers 112 can be virtually any kind of computer printers or peripheral machine configured to produce a persistent representation of graphics and/or text, on a substrate such as paper. Each printer 112 is configured to receive data from one or more of the computer workstations 110_a_ . . . 110_n_ and react accordingly (e.g., to print a version of a document (e.g., drawing or GIS map) with its corresponding QR code on a piece of paper or other physical substrate) based on the data received.

The computer workstations 110_a_ . . . 110_n_ in the illustrated implementation are connected to computer memory 108, which is configured to (and does) store a drawings repository 122 and one or more lookup tables 124.

The drawings repository 122 is a computer database that stores drawings (created and/or rasterized at one or more of the computer workstations 110_a_ . . . 110_n_) in a digital format. In certain implementations, the drawings repository 122 may provide an associated set of data management, search, and access functionalities to enable application-independent access to the drawings. The drawings repository 122 may include multiple different drawings (i.e., drawings showing different subject matter) and one or more versions (or revisions) of each drawing. Thus, for a particular construction project (a residential house), for example, the multiple drawings in the drawings repository 122 may include a framing plan for the house, an electrical plan for the house, a plumbing plan for the house, and a heating, ventilating, and air conditioning (HVAC) plan for the house. In this example (a construction project for the residential house), for each drawing, the drawings repository 122 would include at least an initial version thereof and possibly one or more other versions (revisions of the initial version). Continuing the foregoing example, the drawings repository may include, for example, an initial version of the framing plan and two revised versions thereof, only an initial version of the electrical plan with no revised versions thereof; an initial version of the plumbing plan and four revised versions thereof, and an initial version of the mechanical (HVAC) plan with one revised version of the mechanical (HVAC) plan. In this example, the drawings repository 122 would include three versions of the framing plan (an original and two revisions), one version of the electrical plan (just the original), five versions of the plumbing plan (the original and four revisions), and two versions of the mechanical (HVAC) plan (the original and one revision).

In a typical implementation, each drawing (or document) would have a title, which may be printed on the drawing itself. For drawings that have multiple versions (e.g., revisions), every version of the drawing may have the same title. Therefore, in an exemplary implementation, the original version, the first revision, and any subsequent revisions to a drawing may be assigned the same title (e.g., MirmarResidence_Level2FramingPlan). Additionally, in a typical implementation, every version of a particular drawing (or document) may be assigned (and, e.g., visually marked with) one or more textual indicators (e.g., revision numbers), separate from the substantive (e.g., framing, electrical, or mechanical) information on the plan, that enable users to distinguish between different versions (e.g., revisions) of the document. These textual indicators may include, for example, a version label, such as "S_101," "S_111," or "S-112," to distinguish one version of the drawing from another version of the drawing. For example, the version label "S_101" may be used to identify the initial or original version of a drawing, whereas the version label "S_111" may be used to identify a first revision of the drawing, and the label "S_112" may be used to identify a second revision of the drawing. Of course, any number of alternative labeling conventions could be adopted for labeling and distinguishing different versions of a drawing. The textual indicators that enable users to distinguish between different versions (e.g., revisions) of the document also (or alternatively) may include, for example, a date of the document version, which, for an initial version of the document may be the date that the initial document was created, saved in the drawings repository 122 (or saved elsewhere and then moved to the drawings repository 122), rasterized, printed, and/or designated as "complete" or ready-to-use in computer memory. If subsequent versions (revisions) of the plan are later created, then each version would receive a corresponding date as well. For each such revision, the date for that revision may be the date on which that particular revision was created, saved in the drawings repository 122 (or saved elsewhere and then moved to the drawings repository 122), rasterized, printed, and/or designated as "complete" or ready-to-use in computer memory. Every document in the drawings repository 122 may have a title block, for example, that includes a visible representation of any or all of the foregoing information (i.e., title, version label, and/or date) as well as potentially other or different types of drawing and/or version identifying information.

Additionally, in a typical implementation, every version of completed document in the drawings repository 122 has a unique non-alphanumeric code (e.g., a QR code) that includes information that, when interpreted, identifies the drawing and/or a web-accessible location (e.g., URL) associated with the stored version of that document in the drawings repository 122. Typically, the unique non-alphanumeric code appears, as a visual marking, on the drawing itself. The non-alphanumeric code may be a QR ("quick response") code. However, alternatively, the non-alphanumeric code can be any other type of non-alphanumeric code (e.g., a bar code, etc.) that is able to represent the aforementioned information and that can be read and interpreted/acted upon by a smartphone or other computer-enabled code reader in the manner described herein.

In implementations where the non-alphanumeric code is a QR code, for example, the QR code is generally configured such that, when a QR reader (e.g., 116) on a user's smart device (e.g., smartphone 102) reads the QR code, the smartphone navigates with its web browser (e.g., 118) to a web page hosted by a web server (e.g., 106) where information about the associated drawing and/or versions thereof can be accessed (e.g., from drawings repository 122 and/or lookup table 124). Thus, in this example, the QR code may have been generated from (and include encoded data that represents) a uniform resource location (URL) for the website and may include one or more pieces of identifying information for the associated version of the drawing (including, for example, drawing title information, and/or version identification information, and/or drawing date information, as well as or alternatively other types of identifying information).

Consider, for example, a construction project that includes a drawing (created at computer workstation 110*a*) showing a second level framing plan for a residential facility called the Mirmar Residence, and two later iterations (revisions) of that drawing being produced. In this example, the drawings repository may include all three versions of the Mirmar residence, second level framing plan—the initial (or original) version and two sequential revised versions. The initial or original version may be designated and visually marked by the drawing title (e.g., MirmarResidence_Level2FramingPlan) describing the substantive subject matter of the drawing, designated and visually marked or otherwise identified with a version designator (e.g., S_101) signifying that that particular version of the Mirmar Residence second level framing plan is the initial version of that plan, and designated and visually marked with a date (e.g., Apr. 10, 2022) signifying that that particular version of the Mirmar residence second level framing plan was "completed" for example, on that date. Likewise, the first revision (or second version) of the drawing may be designated and visually marked by the same drawing title (e.g., MirmarResidence_Level2FramingPlan), designated and visually marked or otherwise identified with a version designator (e.g., S_111) signifying that that particular version of the Mirmar Residence second level framing plan is the second version of that plan, and designated and visually marked with a date (e.g., Sep. 5, 2022) signifying that that particular version of the Mirmar residence second level framing plan was designated "completed," for example, on that date. Similarly, the second revision (or third version) of the drawing may be designated and visually marked by the same drawing title (e.g., MirmarResidence_Level2FramingPlan), designated and visually marked or otherwise identified with a version designator (e.g., S_121) signifying that that particular version of the Mirmar Residence second level framing plan is the third version of that plan, and designated and visually marked with a date (e.g., Jan. 26, 2023) signifying that that particular version of the Mirmar residence second level framing plan was designated "completed," for example, on that date. Every one of these drawings would have, associated therewith and visually marked thereupon, a unique QR code. Each of these saved documents (all of which may be rasterized drawings) may be stored together in the drawings repository 122 using a file names to identify the documents as follows, respectively:

MirmarResidence_Level2FramingPlan_S_101_2022-04-10_.DWG,

MirmarResidence_Level2FramingPlan_S_111_2022-09-05_.DWG, and

MirmarResidence_Level2FramingPlan_S_121_2023-01-26_.DWG.

Therefore, the file name for each drawing, in this example, provides an indication of the subject matter of that particular drawing (i.e., that the drawing represents a level 2 framing plan for Mirmar Residence), revision information (e.g., S_101 (initial or original version), S_111 (first revision), and S_121 (second revision)), and the date of each revision (e.g., 2022 Apr. 10, 2022 Sep. 5, and 2023 Jan. 26). In various implementations, more or less information (data or metadata) about the associated documents may be expressed in the file names of the QR-coded documents stored in the drawings repository 122. However, in some implementations, it is preferable that the file-naming convention adopted enable the computer system (e.g., 100) to be able to distinguish between multiple versions (e.g., iterations) of the same drawing based on file name alone.

In a typical implementation, the lookup table 124 in memory 108 stores data (e.g., metadata, such as title, revision number, date, etc.) for each document, and each version of each document, in the drawings depository 122 in a searchable manner. In this regard, each lookup table 124 may include an array or matrix of data entries. Thus, in the foregoing Mirmar residence construction example, the lookup table 124 may include one row for each respective one of the aforementioned three versions of the Mirmar residence, level 2 framing plan—version S_101 (dated Apr. 10, 2022), version S_111 (dated Sep. 5, 2022), and version S_121 (dated Jan. 26, 2023). In some implementations, the entries in each row may correspond with the file name for the corresponding document (drawing). More specifically, in an exemplary implementation, one row in the lookup table 124 may read:

MirmarResidence_Level2FramingPlan_S_101_2022-04-10_.DWG another row in the lookup table 124 may read:

MirmarResidence_Level2FramingPlan_S_111_2022-09-05_.DWG and another row on the lookup table 124 may read:

MirmarResidence_Level2FramingPlan_S_121_2023-01-26_.DWG.

Each lookup table 124 entry in this example includes information that identifies the drawing and the corresponding one of the three revisions of that drawing. In various implementations, the specific arrangement and/or collection of data in each entry can vary. Typically, however, each entry includes enough data to uniquely identify each version of a particular drawing and to distinguish between those versions. The identifying and distinguishing data can be arranged in the lookup tables in any one of a variety of possible ways. The date that corresponds to each revisions of a particular drawing (stored in the drawings repository 122 and represented by an entry/row in one of the lookup tables 124) may be the date that that drawing version was created, saved, printed, and/or assigned and marked with a unique QR code (that corresponds to that particular drawing version).

The smart device (e.g., smartphone 102 in FIG. 1) is a portable computer device that combines mobile telephone functions and certain personal computing functions into one unit. The smartphone 102 in the illustrated implementation has a camera 114, a QR ("quick response") code reader 116, a web browser 118, a display screen, and agent 120. Of course, in various implementations, the smartphone 102 can include a variety of other computer components and, in some implementations, the smartphone 102 can be a different type of mobile device that includes the components and functionalities disclosed herein related to drawing version confirmation, etc.

The camera 114 is built into the smartphone 102 and is able to capture photographs and often record video. The smartphone's display screen 119 generally displays a visual depiction of any scene, and/or any objects in the scene, being photographed or video recorded.

The code reader 116 is built into the smartphone 102 and is able to recognize an image of a code (e.g., a QR code) in a scene being photographed, for example, by the smartphone's camera 114. The code reader 116 is able to convert the recognized image of the QR code into a useful format for the smartphone 102 such as a standard uniform resource locator ("URL") for a website, thereby eliminating the need for a user to type the URL into a web browser. The QR code in this example would contain encoded data that represents the URL for a website associated with the web server 106. Once read, the web browser 118 may use the URL to access the website that corresponds to the URL at the web server. The code reader 116 may be implemented, at least in part, by a computer processor in the smartphone 102 executing computer-readable instructions in computer memory, to interact with the camera and/or the display screen on the smartphone 102.

The smartphone's web browser 118 is an application on the smartphone 102 for accessing websites. In general, when a user requests a web page from a particular website (e.g., by entering a URL for the website into the web browser 118 or by activating a QR code reader to read a URL from a QR code), the web browser 118 is able to retrieve files for that website from a web server (e.g., web server 106) and display a web page on the display screen 119 of the smartphone 102 based on the retrieved files. In some implementations, the web browser 118 may be able to retrieve different files for different websites from the web server 106 (or from multiple different web servers) depending on the URL obtained from the QR code. The web browser may be implemented, at least in part, by a computer processor in the smartphone 102 executing computer-readable instructions in computer memory, to perform functionalities associated with a browser. Some examples of web browsers include the Google Chrome™ web browser, the Apple Safari™ web browser, and the Microsoft Edge™ web browser.

The smartphone's display screen 119 can be virtually any kind of display screen and is integrated into the smartphone 102. The display screen 119, in a typical implementation, is configured to display any scene being photographed or scanned (e.g., for QR codes) and may reveal a user-selectable visual indication of a URL associated with a scanned QR code for example, the selection of which causes the smartphone's web browser 118 to navigate to a web site associated with web server 106 to access information about a drawing associated with the scanned QR code.

The agent 120 is an application on the smartphone 102 that supports or performs one or more of the functionalities described herein that are attributable to the smartphone, which enable of facilitate the checking, from the smartphone 102, of whether a physical drawing (e.g., that the user has in hand) is a desired (e.g., the latest) version of that drawing and, if not, then to enable a user to access the correct version of the drawing, at least in electronic form, and view it on the display screen 119 of the smartphone 102.

The smartphone 102 in the illustrated implementation is connected to the web server 106 via a network 104. The network 104 can be any kind of network across which the indicated system components can communicate and interact. In a typical implementation, the network 104 includes computers, computer equipment, and/or computer resources located at various nodes across the network 104 that communicate and interact with one another over wired or wireless communication channels. In an exemplary implementation, the network 104 is or includes the Internet.

The web server 106, in the illustrated implementation, is located across the network 104 from the smartphone 102 and is connected to the smartphone 102 via the network 104. The web server 106 is a computer that executes software that is able to deliver web pages and/or other documents to the web browser 118 using an application layer protocol, such hypertext transfer protocol (HTTP), for example. The web server 106 includes computer software executing on underlying computer hardware to perform its functionalities. In an exemplary implementation, the web server 106 is able to accept requests (e.g., from smartphone 102 and/or other devices), via HTTP, over the network 104. Specifically, in a typical implementation, the smartphone's web browser 118 may initiate communications with the web server 106 by making a request for a web page or other resource using HTTP, and the web server 106 responds to the request by sending content over network 104 that corresponds to the requested web page or other resource. If the web server 106 is unable to satisfy the web browser's request, the web server 106 may instead return an error message. The smartphone's web browser 118 is able to produce a rendering of a webpage, or other message, on the display screen 119 of the smartphone 102 based on the content provided by the web server 106. In some implementations, the agent 120 influences the content of any messages that may appear on the display screen 119 of the smartphone 102 based on the content provided by the web server 106. As described above, the web server 106 is connected to the computer memory 108 that contains the drawings repository 122 and the one or more lookup tables 124.

The system 100 operates by virtue of multiple parties (e.g., designers and end users) interacting with the system components in different ways. For example, the designer typically creates and revises documents (e.g., drawings and/or maps) at one or more of the computer workstations 110a-110n and saves them in memory 108. The documents may be printed on a printer 112 and then used by an end user in the field (e.g., at a worksite, such as a construction site), for example, to guide construction or other manufacturing activities in the field. The end users, on the other hand, may desire to use the printed documents in the field, for example, to guide their construction or other manufacturing activities. The end users may use the system 100 to check, from the end user's smartphone 102, whether the printed document he or she has is the right (e.g., latest) version of the drawing and, if not, to obtain the right (e.g., latest) version of the drawing at least in electronic form viewable on the end user's smartphone 102. Thus, there are two different sides of the system 100 that operate cooperatively to provide various benefits that help a project run smoothly.

Figure 2A:
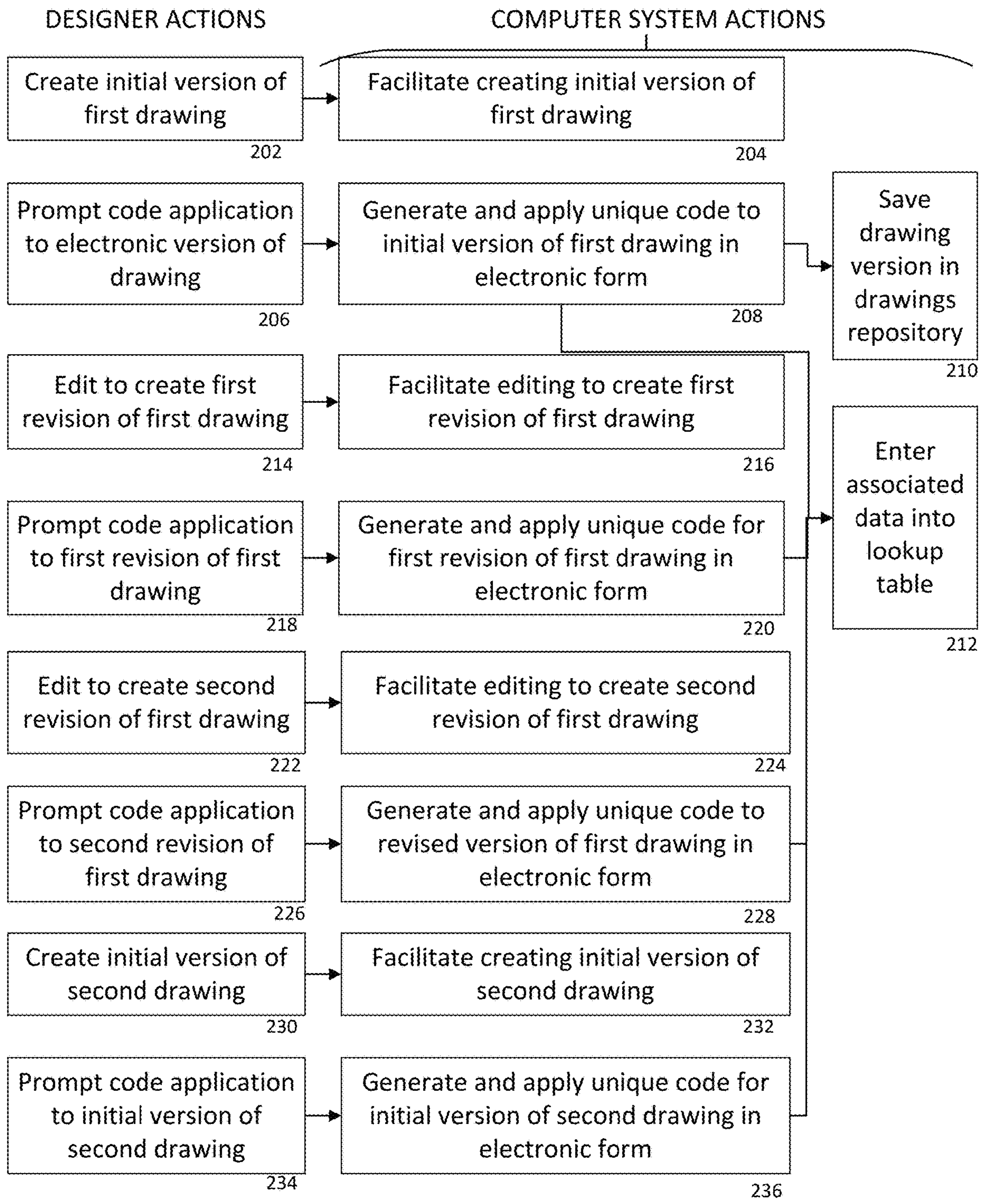
FIG. 2A is a flowchart that represents an example of a process that may occur at a designer end of the computer system in FIG. 1.

FIG. 2A is a flowchart that represents steps taken at the designer end of the system 100 to populate the drawings repository 122 and the lookup table 124 with documents and document related data to support system functionalities. The flowchart is organized into two columns—one of the columns represents actions performed by the designer (labeled "designer actions"), and the other column represents actions performed by the computer system 100 (labeled "computer system actions"). In a typical implementation, the designer's steps would occur by virtue of one or more humans interacting with one of the computer workstations 110a . . . 110n, whereas the computer system steps may be taken by one or more hardware and/or software components of the computer system 100 (including, e.g., one or more computer processors executing computer readable instructions stored in computer memory). The specific process represented in the illustrated flowchart would populate the drawings repository 122 with three version (revisions) of a first drawing (e.g., a level 2 framing plan for Mirmar Residence), and one version of a second drawing (e.g., a level 2 electrical plan for Mirmar residence) and would populate the lookup table 124 with data associated with all three versions (revisions) of the first drawing and the single version of the second drawing.

According to the illustrated flowchart, the designer (at 202) creates an initial version of the first drawing and the computer system (at 204) facilitates creating the initial version of the first drawing. Typically, these steps include the designer working with the design program 126 (e.g., CAD software) on one of the computer workstations 110a . . . 110n to create the design. Eventually, the designer becomes satisfied that the initial version of the first drawing is complete—i.e., ready to be used by an end user in a real world application (e.g., to construct, manufacture, etc. one or more real world objects based on the details represented in the initial version of the first drawing). At that point or at some point thereafter, the designer (at 206) performs an action at one of the computer workstations 110a . . . 110n that causes the computer system 100 to apply a unique identification code (e.g., a visual depiction of a QR code) to the initial version of the first drawing. The specific action by the designer that causes the computer system 100 to apply the unique code can vary and may include, for example, selecting a graphical widget (e.g., a button or the like) on the display screen of one of the computer workstations 110a . . . 110n, or otherwise triggering the computer system 100 to apply the code (e.g., by designating, e.g., in computer memory, that the initial version of the first drawing is ready to be used in the real world action, and that, for the time being at least, the designer is finished modifying the initial version of the first drawing, etc.).

In response to the designer's action (at 206), the computer system 100 (at 208) generates the unique code (e.g., a QR code) and applies the unique code to the initial version of the first drawing. In a typical implementation, the computer system 100 leverages functionalities of the code generator 128 to generate this unique code. Moreover, in a typical implementation, the unique code may be generated by applying a URL, and perhaps other drawing-specific metadata, as an input to the code generator 128. The URL in this example would be for a website at which the initial version of the first drawing (and any other versions of the first drawing) and associated metadata (e.g., title, revision number, date, etc.) in the form of a table will be accessible. Thus, the URL, if read by the camera 114 and/or code reader 116 of an end user's smartphone 102 and then selected by the end user on the smartphone's display screen 119, would cause the smartphone's web browser 118 to navigate to a website hosted by the web server 106 that provides access to the contents of the drawings repository 122 (which would include a typically rasterized version of the initial version of the first drawing) and the lookup table 124 (which would include metadata (e.g., in the form of title, version number, and/or date information) associated with the initial version of the first drawing).

After the computer system (at 208) generates and applies the unique code to the initial version of the first drawing, the computer system 100, according to the illustrated flowchart, saves the initial version of the first drawing (at 210) in the drawings repository 122 and populates the lookup table 124 (at 212) with data and/or metadata about the initial version of the first drawing. In some implementations, these steps (210 and 212) occur automatically after the unique code is applied to the initial version of the first drawing. In other implementations, the designer prompts steps 210 and 212 by taking some action such as selecting a graphical widget on a display screen of one of the computer workstations 110*a* . . . 110*n*. In some implementations, the initial version of the first drawing is saved (at 210) in the drawings repository 122 in a rasterized format.

At this point, or anytime thereafter, the designer, for example, or anyone else may print the initial version of the first drawing (e.g., onto a paper or other physical substrate) through one of the printers 112. The printed initial version of the first drawing would include of course the substantive information associated with the initial version of the first drawing, optional metadata associated with the drawing (e.g., title, version number, date, etc.) which may be presented in a title block on the drawing, and the code (e.g., a QR code) that was applied to the drawing at step 208. This printed initial version of the first drawing may then be taken and used (e.g., in the field) to guide construction and/or manufacturing activities, etc. that are meant to relate to the design represented by the substantive information in the initial version of the first drawing.

Subsequently, according to the process represented in the illustrated flowchart, the first drawing is updated. More specifically, the designer (at 214) edits the initial version of the first drawing to create a first revision of the first drawing, and the computer system (at 216) facilitates the editing to create the first revision of the first drawing. Although the substantive details of the first revision of the first drawing would be different than the substantive details of the initial version of the first drawing, both versions of the first drawing would be directed toward the same general subject matter. For example, although some of the substantive details will differ between the two versions, both might be directed to (and show) the framing plan for the second level of the Mirmar residence. However, in this example, once the edits are complete, some of the substantive details of the first revision of the framing plan would presumably be different than some of the substantive details of the initial version of the framing plan.

Typically, the editing steps include the designer working with the design program 126 (e.g., CAD software) on one of the computer workstations 110*a* . . . 110*n* to edit the preexisting initial design—to produce a first revised version thereof. Eventually, the designer becomes satisfied that the edited version of the first drawing is complete—i.e., ready to be used by an end user in a real world application (e.g., to construct, manufacture, modify, etc. one or more real world objects based on the details represented in the edited version of the first drawing). At that point or at some point thereafter, the designer (at 218) performs an action at one of the computer workstations 110*a* . . . 110*n* that causes the computer system 100 to apply a unique identification code (e.g., a visual depiction of a QR code) to the first revised version of the first drawing.

In response to the designer's action (at 218), the computer system 100 (at 220) generates the unique code (e.g., a QR code) and applies the unique code to the initial version of the first drawing. Again, in a typical implementation, the unique code represents a URL for a website at which the initial version of the first drawing, and the first revisions of the first drawing and associated data/metadata (e.g., title, revision number, date, etc.) in the form of a table will be accessible. After the computer system (at 220) generates and applies the unique code to the first revision of the first drawing, the computer system 100, according to the illustrated flowchart, saves the first revision of the first drawing (at 210) in the drawings repository 122 and adds into the lookup table 124 (at 212) data and/or metadata about the first revision of the first drawing, which will be accessible at a website hosted by web server 106.

At this point, or anytime thereafter, the designer, for example, or anyone else may print the first revision of the first drawing (e.g., onto a paper or other physical substrate) through one of the printers 112. The printed first revision of the first drawing would include of course the substantive information associated with the first revisions of the first drawing, optional metadata associated with the first revision of the first drawing (e.g., title, version number, date, etc.) which may be presented in a title block on the drawing, and the code (e.g., a QR code) that was applied to the drawing at step 220. This printed initial version of the first drawing may then be taken and used (e.g., in the field) to guide construction and/or manufacturing activities, etc. that are meant to relate to the design represented by the substantive information in the initial version of the first drawing.

Of course, with multiple different versions of the same drawing in existence, without the system disclosed herein, a person in the field would have a hard time knowing for sure whether a particular drawing they had in hand (e.g., in the field) was the latest version of that drawing or not. This can lead to uncertainty, confusion, mistakes, wasted time, increased costs, etc. In a typical implementation, the computer system 100 disclosed herein avoids, or at least minimizes, such issues.

Subsequently, according to the process represented in the illustrated flowchart, the first revision of the first drawing is updated. More specifically, the designer (at 222) edits the first revision of the first drawing to create a second revision of the first drawing, and the computer system (at 224) facilitates the editing to create the second revision of the first drawing. Eventually, the designer becomes satisfied that the second revision of the first drawing is complete. At that point or at some point thereafter, the designer (at 226) performs an action at one of the computer workstations 110*a* . . . 110*n* that causes the computer system 100 to apply a unique identification code (e.g., a visual depiction of a QR code) to the second revised version of the first drawing. In response to the designer's action (at 226), the computer system 100 (at 228) generates the unique code (e.g., a QR code) and applies the unique code to the second revision of the first drawing. After the computer system (at 228) generates and applies the unique code to the second revision of the first drawing, the computer system 100 saves the second revision of the first drawing (at 210) in the drawings repository 122 and adds into the lookup table 124 (at 212) data and/or metadata about the same. At this point, or anytime thereafter, the designer, for example, or anyone else may print the second revision of the first drawing (e.g., onto a paper or other physical substrate) through one of the printers 112. This, of course, exacerbates the problem mentioned above of having multiple different versions of the same drawing in existence, in which case, without the system disclosed herein, a person in the field would have a hard time knowing for sure whether a particular drawing they had in hand (e.g., in the field) was the latest version of that drawing or not.

Finally, the illustrated flowchart also shows the designer creating an initial version of a second drawing. The second drawing typically would show completely different subject matter than the first drawing. For example, if the first drawing, and its iterations, shows a level 2 framing plan for Mirmar residence, the second drawing may show a level 2 electrical plan for Mirmar residence. The process involving the initial version of the second drawing is similar to the process involved in the initial version of the first drawing. For example, according to the illustrated flowchart, the designer (at 230) creates the initial version of the second drawing and the computer system (at 232) facilitates creating the initial version of the second drawing. At some point thereafter, the designer (at 234) performs an action at one of the computer workstations 110*a* . . . 110*n* that causes the computer system 100 to apply a unique identification code (e.g., a visual depiction of a QR code) to the initial version of the second drawing. In response, the computer system 100 (at 236) generates the unique code (e.g., a QR code) and applies the unique code to the initial version of the second drawing. The computer system 100 then (at 210) saves the initial version of the second drawing (at 210) in the drawings repository 122 and populates the lookup table 124 (at 212) with data and/or metadata about the initial version of the second drawing. The initial version of the second drawing may then be printed, along with the applied code for use in the field.

Figure 2B:
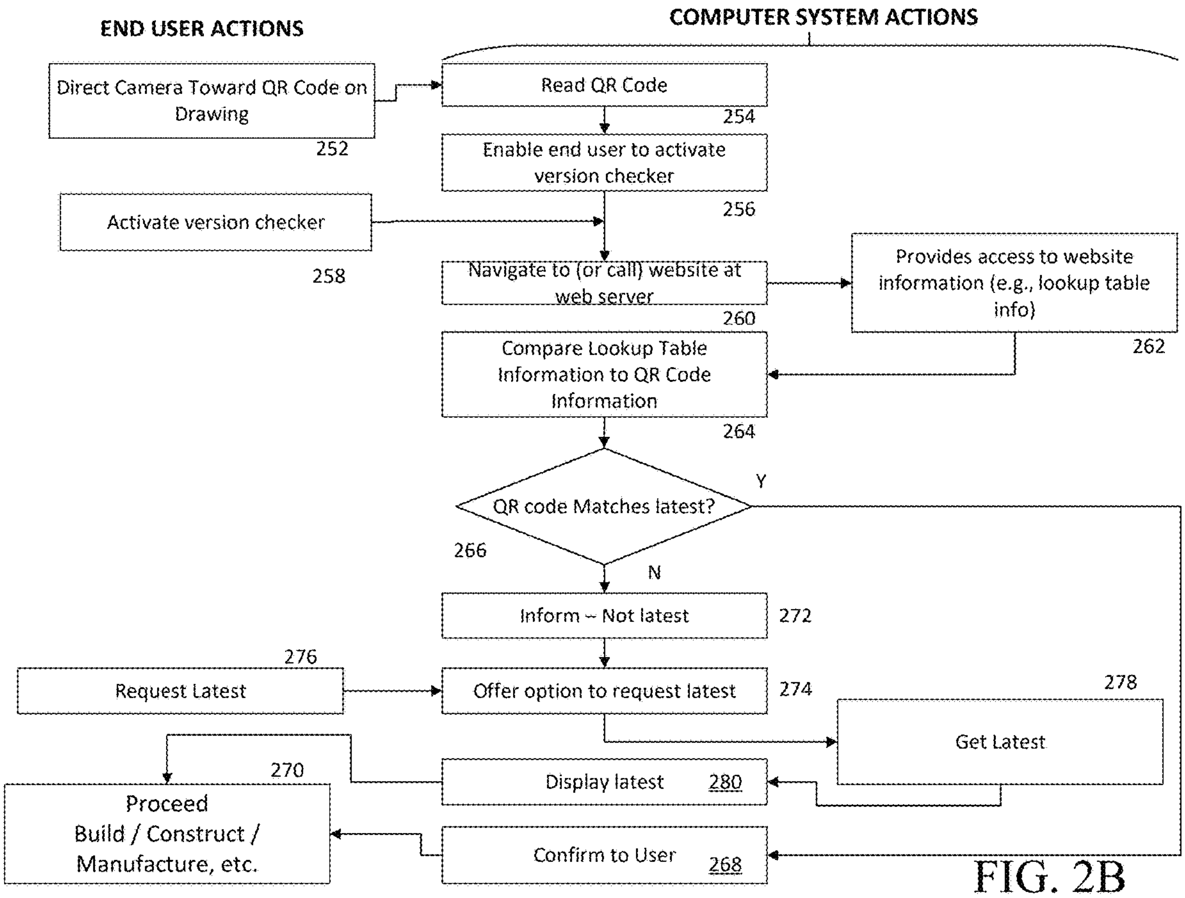
FIG. 2B is a flowchart that represents an example of a process that may occur at an end user end of the computer system in FIG. 1.

FIG. 2B is a flowchart that represents an example of steps that may be taken at the end user side of the system 100 to check whether a particular drawing (in paper form) is the correct (e.g., latest) version of that particular drawing. The flowchart is organized into three columns—one of the columns represents actions performed by a human end user (labeled "designer actions"), one of the columns represents actions performed by the end user's smartphone (labeled "smartphone actions"), and the other column represents actions performed by other parts of the computer system 100 (labeled "other system actions"). In a typical implementation, the end user actions would occur by virtue of the end user using his or her smartphone 102 to check whether a paper version of a document (e.g., a drawing) is the latest version of that drawing (or if the paper version of the document may have been superseded by a later revision thereof). Moreover, in the event that a later version of the document has superseded the version that the end user is checking, as the flowchart indicates, the end user is able to use his or her phone to access the latest version of the drawing in electronic form from his or her smartphone 102. The steps in the flowchart of FIG. 2B presume that the computer system 100 has information about the paper drawing, and any revisions thereof, stored in the drawings repository 122 and the lookup table 124. The end user would know that at least because the paper version of the drawing would have a visual non-alphanumeric code (e.g., a QR code) on the drawing.

The process represented in the illustrated flowchart begins (at 252) with the end user scanning the QR code on the paper drawing by directing the smartphone's camera 114 toward the QR code. In a typical implementation, as the camera 114 focuses on the portion of the paper drawing that has the QR code, and the code reader 116 in the smartphone 102 recognizes and reads the QR code (at 254). In a typical implementation, the QR code on the paper drawing is encoded with a URL for a website hosted by the web server 106 that enables the smartphone 102 to access information stored in memory 108 including, for example, information in the lookup table 124 and/or any drawing versions stored in the drawings repository 122. Additionally, in a typical implementation, the QR code on the paper drawing may be encoded with information that identifies metadata about the drawing including drawing title, revision information, and/or date.

The smartphone 102 presents the end user with an option to activate subsequent steps in the version checking process (at 256). In this regard, the smartphone 102 may present to the end user an end user-selectable link on the display screen 119 of the smartphone 102 that the end user can select to trigger the next step(s) in the version checking process. The link may appear on or next to the QR code on the display screen 119 and may reveal and appear as the URL that is associated with the drawing. The end user may activate subsequent steps in the version checking process by selecting (e.g., touching the display screen 119 at) the link.

The end user in the illustrated process does in fact activate the next steps of version checking process (at 258) by selecting the link. In this example, selecting the link on the display screen 119 causes the web browser 118 of the smartphone 102 (at 260) to navigate to a website, hosted by web server 106, that provides access to the information (e.g., in 122 and/or 124) about the drawing at issue, and any revisions thereof. The web server 106, according to the illustrated implementation, provides the information (e.g., from 122 and/or 124) about the drawing at issue (at 262) by providing the smartphone 102 with access to the website. In a typical implementation, the information includes at least information about the drawing and any versions thereof from the lookup tables 124. In some implementations, the web server 106 may utilize the drawing information (e.g., title, etc.) obtained at 254 to identify the specific drawing whose information should be provided on the website.

The smartphone 102, according to the illustrated implementation, receives the information (e.g., from the lookup tables 124) from the web server 106 and (at 264) compares that drawing information to the drawing information that was read (at 254) from the paper drawing (e.g., revision information and/or date information). In an exemplary implementation, the system 100 may include a function that can be called upon to return from the lookup table 124 the latest (or any other requested) version of a particular drawing (e.g., the Mirmar Residence, Level2, Framing Plan, version S_121, dated 2023 Jan. 26). The smartphone 102 compares this information from the latest drawing in the lookup table 124 to the corresponding information (e.g., title, version information, and/or date) read from the QR code (at 254). If the smartphone 102 (at 266) determines that the paper version of the drawing is the same as the latest version of the drawing in the lookup table 124 (e.g., based on the comparison at 264), then the system 100 (at 268) confirms this determination to the end user. In a typical implementation, the system 100 performs this function by presenting a confirmation message (e.g., "the drawing you checked is the latest version") to the end user on the display screen 119 of the smartphone 102. At that point, and as indicated in the illustrated flowchart, the end user (at 270) proceeds to rely on the paper drawing he or she checked (that has now been confirmed as the latest version of that drawing) and performs whatever real world tasks (e.g., building, constructing, manufacturing, etc.) rely on the drawing being the latest version thereof. If the smartphone 102, however, (at 266) determines that the paper version of the drawing is not the latest version of that drawing (e.g., based on the comparison at 264 revealing differences in metadata for the paper form of the drawing and the latest version represented by the lookup table data), then the system 100 (at 272) presents a message to the end user (e.g., "the drawing you checked is NOT the latest version") on the display screen 119 of the smartphone 102. In that case, the system 100 also presents to the end user (at 274) functionality (e.g., a user-selectable widget on the display screen 119 of the smartphone 102) that enables the end user to request the latest version of the drawing from his or her smartphone 102. In this regard, the system 100 may present to the end user a user selectable widget on the display screen 119 of the smartphone 102, the selection of which causes the smartphone 102 to request (e.g., from the web server 106) a copy of the latest version of the drawing (e.g., from the drawings repository 122). Once the web server 106, for example, gets the latest version of the drawing from the drawings repository 122 (at 278), the web server 106 makes the latest version of the drawing available for viewing (e.g., through the web browser 118) on the display screen 119 of the smartphone 102. The smartphone 102 (at 280) displays, in electronic form, the latest version of the drawing on its display screen. At that point, according to the illustrated implementation, the end user (at 270) proceeds to rely on the latest version of the drawing on the display screen 119 of his or her smartphone 102 to perform whatever real world tasks (e.g., building, constructing, manufacturing, etc.) rely on the drawing being the latest version thereof.

Alternatively, in some implementations, once the end user activates the QR code checker (at 258), the smartphone 102 calls a function that the causes the computer system 100 to return the latest version of the corresponding document automatically. In this implementation, once the QR code has been read, the QR code would reveal a URL for accessing information about the drawing and information identifying the drawing and the version thereof (e.g., title and/or revision, date, etc.). The smartphone 102, in that example, may call the aforementioned function and the system would respond by identifying whether any later versions of the drawing exist (e.g., by comparing the drawing information from the scanned QR code to drawing information in the lookup table 124) and, depending on the outcome either notifying the end user (on his or her smartphone) that the drawing version he or she already has is the latest version thereof (e.g., if the call returns the same drawing information that was in the scanned QR code) or providing a copy of the latest version thereof, on his or her smartphone (or tablet) (e.g., if the call returns different drawing information than what was in the scanned QR code).

Figure 3:
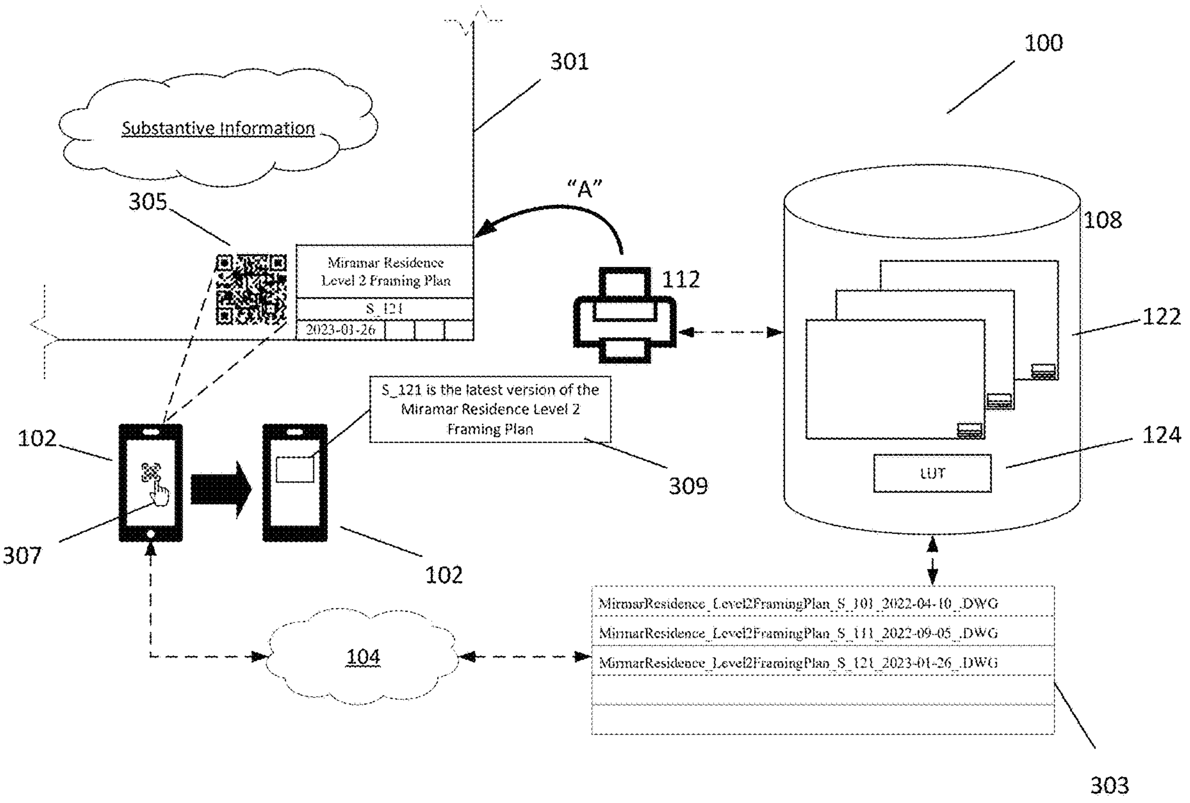
FIG. 3 is a schematic representation showing various components in the context of an exemplary system and an exemplary set of interactions between the illustrated components to check whether a particular paper drawing is the latest version of that drawing or not.

FIG. 3 is a schematic representation showing various components in the context of an exemplary system 100 and an exemplary set of interactions between the illustrated components to check whether a particular paper drawing 301 is the latest version of that drawing or not. The illustrated components include parts of the computer system 100 such as an end user's smartphone 102 (shown at different points in time), a network 104 (e.g., the Internet), computer memory 108 that contains a drawings repository 122 and a corresponding lookup table (LUT) 124, and a printer 112. The drawings repository 122 in the illustrated example includes three drawings, which may have the following file names:

MirmarResidence_Level2FramingPlan_S_101_2022-04-10_.DWG,

MirmarResidence_Level2FramingPlan_S_111_2022-09-05_.DWG, and

MirmarResidence_Level2FramingPlan_S_121_2023-01-26_.DWG.

and the lookup table 124 includes the foregoing information about the drawings, organized into searchable tabular form (see 303). The printer 112, as indicated by arrow "A," has printed one of those drawings, specifically, MirmarResidence_Level2FramingPlan_S_121_2023-01-26_.DWG. The end user has the printed (on paper) version of that drawing 301 in hand, but does not know whether he or she is looking at the latest version of the drawing, or whether there might be later versions that include substantive information—perhaps important details (e.g., on construction, manufacturing, etc.)—that he or she does not know about (because those details are not reflected in the version of the drawing 301 he or she has). The drawing 301 has a section that includes substantive information, a title block that identifies the name of the drawing, version information for the drawing, and a date of the drawing. The drawing 301 also has, printed on its surface, a unique code (e.g., QR code 305). The QR code 305, as indicated elsewhere herein, may include an encoded URL for a website where information on available versions of the drawing 301 can be accessed and checked, as well as other information, such as some or all of the information in the title block of the drawing 301.

As shown, the end user focuses the camera of smartphone 102 onto a portion of the drawing 301 that has the QR code 305. The QR code 305 appears on the display screen of the smartphone and the QR reader recognizes and responds to the QR code 305. Specifically, the smartphone produces an end user-selectable link on its display screen that, as shown, is touched by the end user's hand 307. This causes the smartphone 102 to access remote information from the lookup table 124, specifically the information at 303, across the network 104. That information is referenced to determine whether the drawing 301 is the latest version of the drawing in the system 100. In the illustrated example, the system 100 determines that the drawing 301 is, in fact, the latest version of the drawing in the system 100 and, therefore, produces a message 309 on the smartphone 102 confirming that "S_121 is the latest version of the Mirmar Residence Level 2 Framing Plan." Thus, the user can then proceed with whatever real world product relies on the up-to-datedness of the drawing 301 with confidence, relying on that drawing 301.

Figure 4:
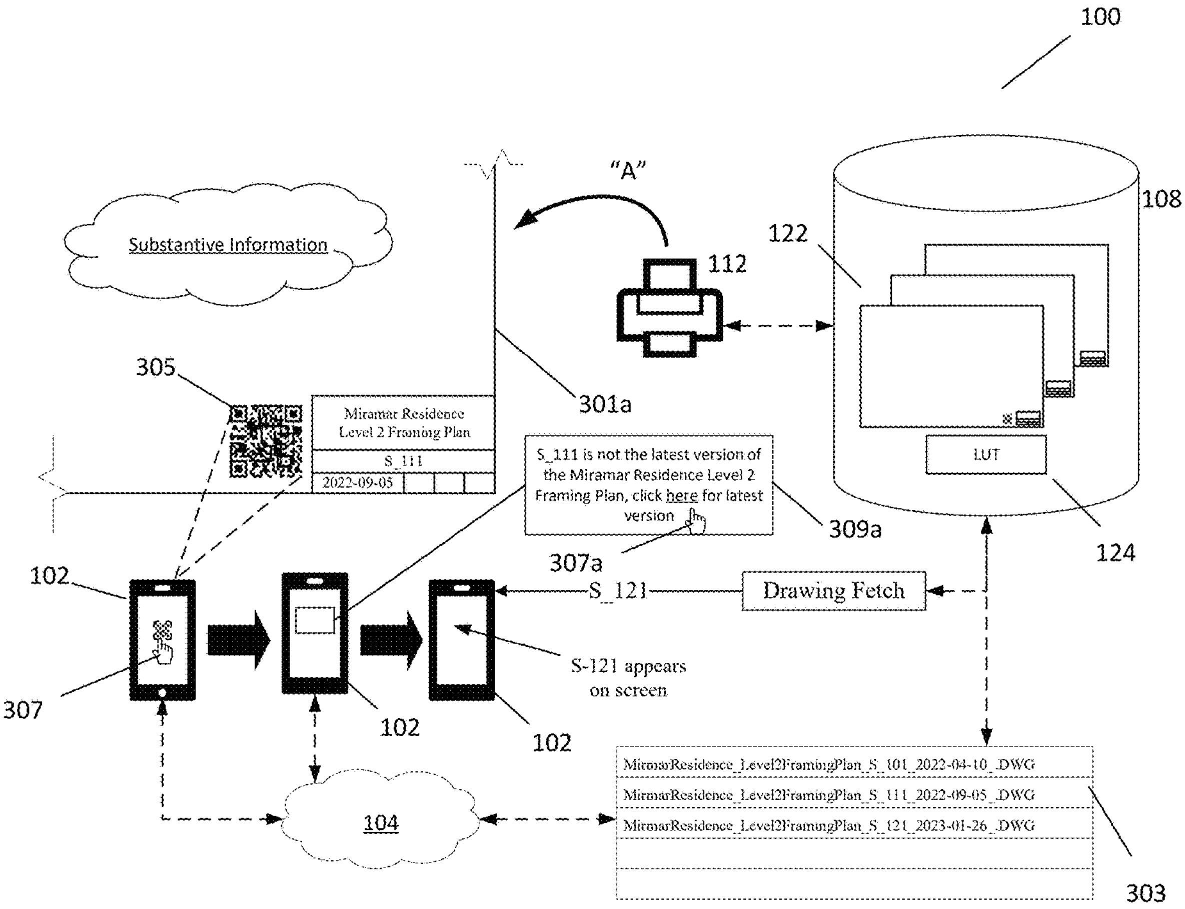
FIG. 4 is a schematic representation showing other various components in the context of an exemplary system and another exemplary set of interactions between the illustrated components to check whether a particular paper drawing is the latest version of that drawing or not.

FIG. 4 is a schematic representation showing various components in the context of an exemplary system 100 and an exemplary set of interactions between the illustrated components to check whether a particular paper drawing 301 is the latest version of that drawing or not. The components in FIG. 4 are substantially similar to the components in FIG. 3. However, in the example in FIG. 4, the drawing 301*a* is not the latest version of that drawing in the system 100.

As shown, the end user in FIG. 4 focuses the camera of smartphone 102 onto a portion of the drawing 301*a* that has the QR code 305. The QR code 305 appears on the display screen of the smartphone and the QR reader recognizes and responds to the QR code 305. Specifically, the smartphone produces an end user-selectable link on its display screen that, as shown, is touched by the end user's hand 307. This causes the smartphone 102 to access remote information from the lookup table 124, specifically the information at 303, across the network 104. That information is referenced to determine whether the drawing 301*a* is the latest version of the drawing in the system 100. In the illustrated example, the system 100 determines that the drawing 301 is not the latest version of the drawing in the system 100 and, therefore, produces a message 309*a* on the smartphone 102 indicating that "S_111 is not the latest version of the Mirmar Residence Level 2 Framing Plan" and that offers the end user the option to "click here for the latest version," where the word "here" is a hyperlink to a website hosted by web server 106 that can provide access to the latest version of the drawing—i.e., the drawing in the drawings repository 122 having the file name:

MirmarResidence_Level2FramingPlan_S_121_2023-01-26_.DWG.

At this point in the process, the end user knows that the paper version of the drawing 301*a* is not the latest version of the drawing 301*a* and can opt to touch the "here" in message 309*a* to access the latest version of the drawing on the display screen of the smartphone 102. The end user, in this example, does opt to touch the "here" link (as indicated by hand 307*a*) and the system 100 responds by producing an electronic version of the drawing at the display screen of the end user's smartphone 102. Thus, the user can then proceed with whatever real world product relies on the up-to-datedness of the drawing 301 with confidence, relying on the electronic version of the drawing on the display screen of the smartphone 102, but discarding or at least not solely relying on the paper version of the drawing 301.

In view of the foregoing, it can be seen that, in an exemplary implementation of the systems and techniques disclosed herein, in order to prepare a drawings repository, a QR code is added to each 2D CAD drawing of the 2D repository, such as a DWG drawing. In a typical implementation, this QR code identifies the 2D CAD drawing (e.g., by title) and its specific revision (e.g., by revision number and/or date). A corresponding rasterized 2D drawing, such as a TIFF or a PDF, may be generated, with each validation of a new revision to a drawing, or generated on the fly upon request (e.g., by a designer). For example, drawing files entitled ABCa.DWG, ABCb.DWG, ABCc.DWG, and ABCd.DWG may be four successive versions of a particular 2D CAD drawing. Upon creation of each version, a corresponding rasterized 2D PDF may be generated: ABCa.PDF, ABCb.PDF, ABCc.PDF, ABCd.PDF (with a unique QR code having been applied to each respective one of the pdf files). In this example, the end user has in hand or views (electronically) the rasterized 2D drawing ABCb.PDF. If the end user wants to verify that it is the correct version to use, the end user captures the QR code of that PDF with the camera of his mobile device (e.g., smartphone). The computer system receives the QR code for ABCb.PDF and would return a message like "correct 2D drawing" if ABCb were the correct (e.g., latest version of the drawing), or provides the end user, for example, with a message like "incorrect 2D drawing" and/or provides the latest version of the drawing in a PDF form, i.e., ABCd.PDF. In this example, the computer system would provide the end user with the rasterized 2D drawing ABCd.PDF.

Figure 5:
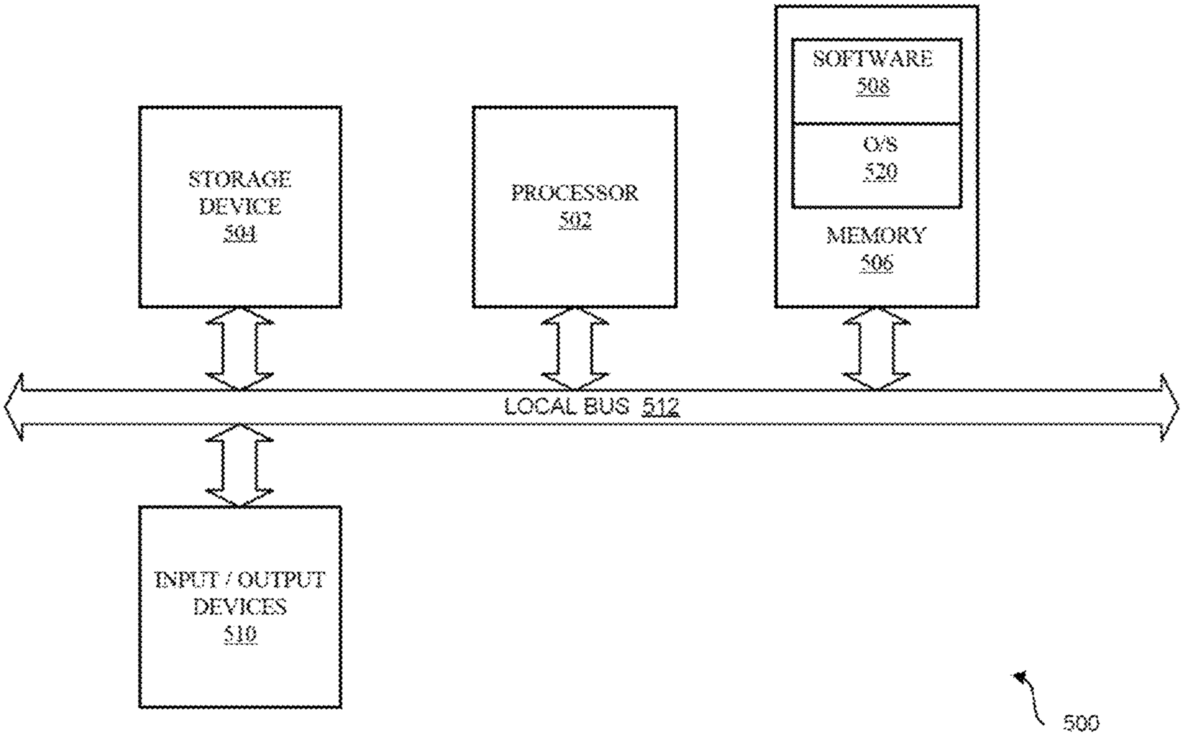
FIG. 5 is a schematic representation of, at least part of, a computer (e.g., a computer workstation, a smart device (e.g., a smartphone or tablet), a server, etc.

In various implementations, any one or more of certain components (e.g., the computer workstations, servers, etc.) described herein may be implemented as a computer (e.g., system 500), an example of which is shown in the schematic diagram of FIG. 5. In some implementations, the system may be implemented at least partially in the cloud. The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example, but not limited to, one or more buses or other wired or wireless connections. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a microprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502. Likewise, the processor 502 may be a single processor or a distributed system of multiple processors, for example, two or more servers.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

In implementations where the system 500 is (or portions thereof are) implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium (including, e.g., non-transitory media) for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In implementations where the system 500 is (or portions thereof are) implemented in hardware, the system 500 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The following is an example of using the computer system 100.

Assume an onsite worker wants to validate that he or she has the correct (e.g., the latest) 2D drawing for a particular project. The onsite worker, or any authorized user, has in hand a printed version of the drawing or views on the display of his or her device the 2D drawing. The onsite worker operates his or her smartphone to grab the QR code of the drawing (e.g., by opening the camera of the smartphone and positioning to grab the QR code). The onsite worker causes the smartphone to launch a call based on the QR code where the call contains a reference (e.g., from the QR code) to the current (i.e., latest) version 2D drawing.

This activates the computer system to respond to the onsite worker. In this regard, upon receiving the content of the QR code of the document available to the worker in print or as a digital file, the system searches the repository contents from that file format using the lookup table. Other searches may be performed under different formats. The QR code URL and identifier is received by the system. It may be used as an input in a DWG table with the identifier contained in the QR code. This table lists all revisions which have been made on each of the DWG 2D CAD drawings. The system typically selects the latest revision of the 2D CAD drawing as the correct one. The system checks (e.g., ABCb.DWG) in the table and either returns a message like "correct 2D drawing," or provides the worker, for example, with the latest version of the PDF (optionally with a message indicating that the in hand version is not the latest. In this example, the system would provide the worker with the 2D raster drawing ABCd.PDF. Specifically, for example, the worker receives the information as "correct 2D drawing in hand" or receives the correct version of the rasterized 2D drawing on his or her smartphone (or tablet).

As another example, the use of the system for a GIS map or data is similar to the one of the 2D CAD drawings. In this example, the onsite worker wants to validate that he has the correct GIS map or data file. The onsite worker, or any authorized user, has in hand a printed version of, or views on the display of his or her device (e.g., smartphone), a GIS map and/or data file. The onsite worker activates a QR code reader on the smartphone (e.g., by opening the camera of its smartphone and positioning it so it can grab the QR code of the map, e.g., in print) or otherwise read from the digital file. The onsite worker takes action to launch a call based on the QR code containing the reference to the current GIS map and/or data file.

In this example, upon receiving the content of the QR code of the document available to the worker in print or as a digital file, the system searches the repository contents from that file format using the lookup table. In some cases, additional searches may be performed under other formats. The QR code URL and identifier is received by the system. It is used as an input in a GIS map or data file lookup table with the identifier contained in the QR code. This table lists all revisions, which occurred on each GIS map or data file. The system typically selects the latest revision of the GIS map or data file as the correct one.

Using the example above, the user has in print or in file:

Basename_LayerName_V2_Date2.shp
Basename_LayerName_V2_Date2.shx
Basename_LayerName_V2_Date2.dbf The device of the onsite worker communicates to the system the content of the QR code. The system receives the corresponding QR codes. It checks in the lookup table and either returns a message like "correct GIS map or data file" on the smartphone or tablet of the onsite worker or provides the onsite worker with the latest version of GIS map and data file.

In this example, the system provides the worker with the GIS map or data file:

Basename_LayerName_V3_Date3.shp
Basename_LayerName_V3_Date3.shx, and/or
Basename_LayerName_V3_Date3.dbf, where these represent the latest version.

Figure 6:
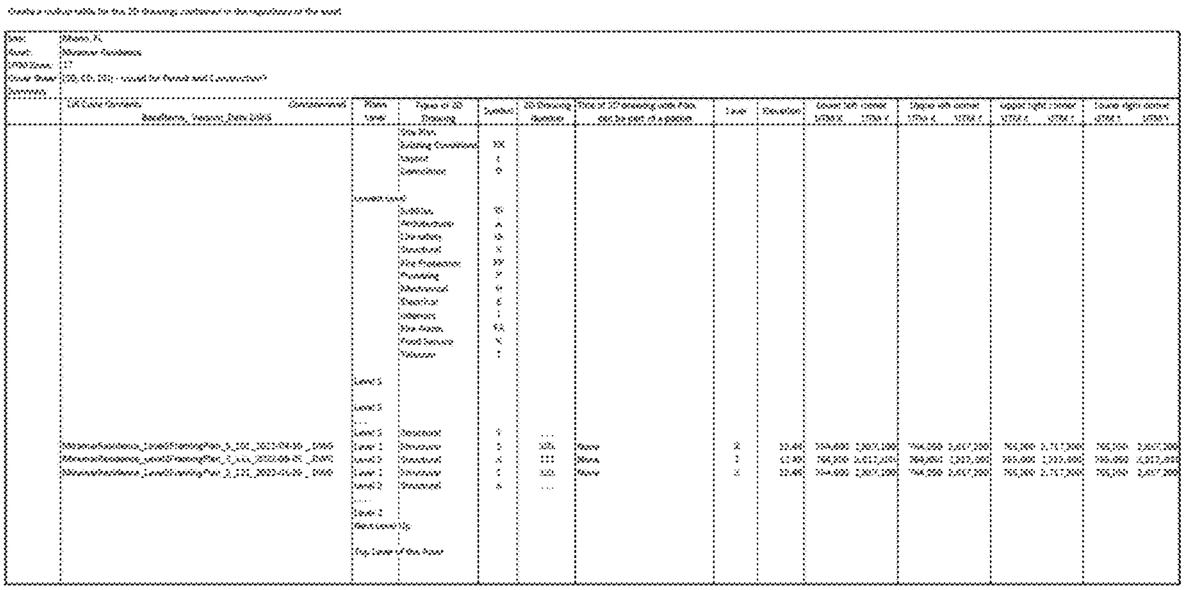
FIG. 6 is an example of a lookup table for 2D drawings that may be stored in computer memory.

FIG. 6 is an example of a lookup table for 2D drawings that may be stored in computer memory. In the illustrated example, the lookup table includes a site identifier (Miami, FL), an asset identifier (Mirmar Residence), location and other geographical location identifiers (e.g., UTM Zone 17, and the corner coordinates of UTM X and UTM Y), permitting information (e.g., "Cover Sheet: (SD, CD, DD)—Issued for Permit and Construction?"), QR code contents ((e.g., basename, version, date) concatenated in DWG file name format), plane level identifiers (e.g., lowest level, Level 1, Level 2, Next Level up, Top Level of Asset), drawing type identifier (e.g., site plan, existing condition, layout, demolition, subslab, architectural, life safety, structural, fire protection, plumbing, mechanical, electrical, interiors, fire alarm, food service, telecom, etc.), applicable trade identifiers (e.g., symbols EX, L, D, SS, A, LS, S FP, P H, E, I, FA, K, T, and S), 2D drawing numbers (e.g., 101, 111, 121) for available drawings to identify versions, level and elevation identifiers, etc. The top of the figure indicates that the figure relates to creating a lookup table for the 2D drawings contained in the repository of the asset. Variations are, of course, possible.

FIG. 7 is an example of a lookup table for GIS maps that may be stored in computer memory. In the illustrated example, the lookup table includes location information (e.g., Miami, FL), more geographical information (e.g., North East Miami), QR Code Contents (e.g., a concatenation of base name, version, and date, along with a file extensions), frequent main formats (e.g., shapefile, keyhole markup language, web map services layers, vector data, Esri File Geodatabase, Grid-cell data (raster data), Shape Index File, dBase Attribute File, etc.), Format extensions (e.g., .shp, .shx, .dbf, .prj, .shp.xml, .sbn, .kml, GeoJSON, GDB, .tif, etc., associated files (e.g., Shape Index File, dBase Attribute File, Projection File, Additional data, Queries with ArcGIS, Xple Layers/Features, Managed from server, datatype, resolution, etc.), frequent (F) vs. common (c) and TN, Type of Map (e.g., admin/political boundaries, census data, cultural (historical sites, monuments, . . . ), digital elevation model, earthquake zones, hydrology (rivers, lakes, etc.), land use, land parcels and ownership, population, railroad networks, soil types or soil characteristics, transportation network, topography, utilities (power lines, optical fiber, etc.), vegetation, zoning areas, etc.), map symbols (e.g., BND, CENSUS, CULT, DEM, EQZ, HYDRO, LU, PARCEL, POP, RAIL, SOIL, TN, TOPO, UTIL, VEG, ZONING), etc. The illustrated figure also indicates, at the top of the page, that the information contained therein relates to creating a lookup table for the GIS and data files contained in the repository of the project or geographical area. The content in this example is first ordered by main format, and their associated files, if any. Then, within a main format, the content is ordered alphabetically (e.g., from A to Z) by Type of Map using their map symbols. The next step, as indicated, is to order the content by version and date. Variations are, of course, possible.

A number of embodiments of the invention have been described. Nevertheless, it will be understood that various modifications may be made without departing from the spirit and scope of the invention.

For example, the systems and techniques disclosed herein can be applied to confirm the versioning of virtually any kind of document (e.g., drawing, GIS map, etc.) directed to some substantive information and that is subject to being changed over time and for which it is important to understand that the "right" (e.g., a desired version and/or latest version) is being used or referred to.

The systems and techniques disclosed herein can be applied to check on electronic (as well as real-world physical) versions of a document. In those instances, an electronic version of the document at issue can be positioned such that the QR code on it appears on the display screen of a smartphone and the smartphone's QR reader may recognize the presence of that QR code and react accordingly, as described herein.

Users generally do not have access to CAD or GIS design software which requires installing the design software or its access on the smartphone. They do not have the knowledge and the training to interact with such design software. In fact, they are not allowed to edit it. They tend to use rasterized drawings because they are more compact in the drawings filesize, and only annotate these drawings when needed.

The systems and techniques disclosed herein may be applied to track and manage document versions regardless of naming conventions adopted to name the document files in a particular computer system. In this regard, any one or more of a variety of different naming conventions may be adopted. Naming successive versions of 2D drawings, GIS maps, data files, etc. can, of course, be important for maintaining organization, clarity, and easier reference in many domains. Onsite or in-field workers are often only working with a print on paper or with a digital file. They need to validate that the document(s) they have in hand are the correct one(s) and if not, access the correct one(s).

2D CAD drawings in the context of assets such as buildings, structures, and plants, for example, tend to undergo many changes through their entire lifecycles from construction to dismantlement. There are many possible ways to name the successive versions of such drawings. Two examples are discussed below. The first example would be to append a version identifier using letters or numbers, for example, to a base name of the 2D CAD drawings to denote the different versions. The first method often also includes adding a date or a timestamp. For example:

MiramarResidence_Level2FramingPlan_A_2022-04-10
MiramarResidence_Level2FramingPlan_B_2022-09-05
MiramarResidence_Level2FramingPlan_C_2023-01-26

The example would keep the base name and increase the 2D CAD drawing number. Base names are unique identifiers. Each base name contains the trade of the 2D CAD drawing such as S for structural, E for Electrical and M for Mechanical. The sequence of the same base name is generally available from 100 to 999.

Another example, and the one described above, would append an available number in a sequence. For example, if 2D CAD drawings 100, 101, 102, 103, already exist, 111 may be a newer version which deprecates the initial version 101. The next available number for another new version would be the packet containing 2D documents 121, 122, and 123. When needed, in some cases, the quantity of serial numbers can be increased by creating derivatives, such as 102.1, 102.2, 102.3, etc. In all cases, even deprecated 2D CAD drawings resulting for example from change orders, performance improvements, or revisions are maintained in the digital repository.

Naming conventions for GIS (Geographic Information System) maps (and/or other data files) may vary depending on the organization, project, formats, and company preferences. Some practices may include elements in the naming conventions to ensure consistency, clarity, and ease of organization. The base name in some such practices may include, for example, the name of the project or an identifier, the primary location or geographical area, the type of the map, and or the scale of the map. Successive versions of the map include the version number (A, B, C . . . or 1, 2, 3) and the date of creation or date of update of the map. Depending on the specific requirements of the organization or project, additional information such as a reference number, author, or any other relevant metadata may be included.

In some instances, the type of map identifies the purpose of the map. Some common examples of are: BND: Administrative or Political Boundaries, CENSUS: Census Data, CULT: Cultural Features (Historical sites, monuments, etc.), DEM: Digital Elevation Model, EQZ: Earthquake Zones, HYDRO: Hydrology (Water features such as rivers, lakes, etc.), LU: Land Use, PARCEL: Parcel Information (Land parcels and ownership), POP: Population, RAIL: Railroad networks, SOIL: Soil Types or Soil Characteristics, TN: Transportation Network, TOPO: Topography, UTIL: Utilities (Utility infrastructure: pipelines, power lines, optical fiber, etc.), VEG: Vegetation, and ZONING: Zoning Areas.

When a map is composed of different layers or data sets, one can include a brief description of the main layers in the map name, or alternatively describe each of them.

Principles of naming conventions may apply to various GIS data formats, such as shapefiles, Keyhole Markup Language (KML) files, Web Map Service (WMS) layers, vector data, and grid-cell data. There are some format-specific considerations to keep in mind. For example, when naming shapefiles and their associated files (.shx, .dbf, etc.), it can be important to maintain consistency across all the associated files within a shapefile dataset. For example:

Basename_LayerName_Version.shp
Basename_LayerName_Version.shx
Basename_LayerName_Version.dbf Keyhole Markup Language (KML) files are typically standalone and can contain multiple layers or features. Naming conventions for KML files, for example, can focus on describing the content or purpose of the KML. For example:

BaseName_LayerName.kml
Location_FeatureType.kml

Web Map Service (WMS) layers are typically accessed through URLs and service endpoints. Naming conventions might not be as relevant for WMS layers since the naming is often managed on the server side. However, when saving a local reference to a WMS layer, one may use a naming convention like:

BaseName_WMSLayerName

For vector data formats such as GeoJSON or Esri File Geodatabase (GDB), the naming conventions may be adapted to suit the format while maintaining the same principles. For example:

BaseName_LayerName_Version.geojson
BaseName_LayerName_Version.gdb

The naming conventions used for grid-cell data, such as raster datasets, may focus on describing the data's content, resolution, and any relevant metadata. For example:

BaseName_dataType_Resolution_Date.tif
Location_ElevationModel_30m_2022.tif

The QR codes for a 2D CAD drawing or GIS map and data files may be generated in any one of a variety of ways. In such implementations, each 2D CAD drawing of the 2D repository (e.g., a DWG file), may be provided with a QR code identifier, and/or each GIS map and data files of the other repository, such as Shapefiles may be provided with a QR code identifier. In some implementations, the minimum number of pixels for a QR code to be readable depends on several factors, including the size of the QR code, the level of error correction used, and the reading conditions. The larger the QR code, the more information it can hold and the more it can be read from a further distance. A standard size QR code may contain up to around 3,000 alphanumeric characters. In some implementations, it may be desirable to have a resolution of at least 21×21 black and white squares, modules, to ensure correct reading. This means that the QR code will typically have a minimum dimension of 21 pixels wide and 21 pixels high. The contents of a QR code may vary according to the type of repository, CAD or GIS, the format extension, etc. It may be appropriate to include the BaseName, its alpha or numeric revision identifier, a date, and/or the type of format extension. For better readability and greater reading reliability, a higher resolution may be desirable. For example, for a medium-sized QR code, with around 100 alphanumeric characters, a resolution of 33×33 modules or more may be preferable.

In some implementations, a serialized QR code generator may be used to create multiple QR codes with sequential or incremental data. Here, such a serialized QR code generator may be used to uniquely identify each of the successive revisions of a 2D CAD drawing or GIS map and data file.

As mentioned, a corresponding rasterized 2D drawing, such as a PDF may be generated with each validation of a new drawing (or new drawing revision) and/or the generation and/or application of a corresponding QR code to that drawing, or on the fly upon request (e.g., by a designer at one of the computer workstations). For example, if ABCa.DWG, ABCb.DWG, ABCc.DWG, ABCd.DWG were the file names for four successive versions of a particular 2D CAD drawing, following the creation of each version, a corresponding rasterized 2D PDF may be generated immediately (e.g., upon validation or saving) or on the fly when requested. These corresponding rasterized 2D PDFs may be named ABCa.PDF, ABCb.PDF, ABCc.PDF, ABCd.PDF. In the case of a GIS map and data file, each of the additional components may be updated whenever necessary:

Basename_LayerName_V3_Date3.shp
Basename_LayerName_V3_Date3.shx
Basename_LayerName_V3_Date3.dbf In various implementations, if a new drawing has been created, or an existing drawing has been edited, then that drawing may be considered to have been validated (and treated by the system as such) in response to (and when) the designer has released the new drawing or the newly edited drawing into the repository which in turn pushes it (e.g., the associated metadata) into the lookup table. The same mechanism may be used by the designer for a packet of 2D drawings.

In various implementations, a QR code may be added to a new document (e.g., a 2D drawing) as it is being created or revised. Alternatively, for pre-existing documents (e.g., 2D drawings), a QR code may be created and applied to the 2D drawing already in an existing repository. In such instances, the creation of a QR code for each 2D drawing in an existing repository may be easy to automate by implementing one or more of the aforementioned naming schemes, for example, and/or serial QR code generators.

In a typical implementation of collaborative systems, the systems ensure that creating or editing a drawing can be done only by a single designer at a time. A designer reserves a drawing (check-in), modifies it, and put it back in the repository (check-out). In parallel, all drawings are kept during their lifecycle in the repository, so traceability and auditing are possible. This is more easily done when you are in a "single source of truth," but can also work with a Masterfile process.

In some implementations, the lookup table may be created with a QR code link for 2D drawings. In some such implementations, the BaseName of the 2D drawing may contains one or more (or all) of: the name of the asset, the level of the drawing (elevation), the type of 2D drawing (e.g., A, S, E, I . . . ), the ordinal number of the 2D drawing in the type of 2D drawing, the revision number or letter of the 2D drawing, and/or the date of creation or date of revision. Moreover, a reference may be included such as Reference (LOOKUP TABLE QR 2D CAD v.0.4.0.xlsx).

For a GIS map and related data files repository, a QR code may be added to a new map and related data files as they are being created or revised. Alternatively, a QR code may be added to an existing asset/document (e.g., a GIS map and related data files). In such instances, the creation of a QR code for each of the map and associated data files of an existing repository asset/document can be automated, for example, by implementing one or more of the aforementioned naming schemes and/or by using a serial QR code generator. Likewise, in various implementations, the creation of a QR code for each of the map and associated data files of an existing repository can be automated, for example, by implementing one or more of the aforementioned naming scheme and/or by using a serial QR code generator.

With GIS and related data files, for example, a lookup table may be created with QR code links where the BaseName of each map and related data files includes one or more (or all) of: the name of the project or an identifier, the primary location or geographical area, the type of the map, and/or the scale of the map. These attributes may be concatenated to create the BaseName. As mentioned above, additional attributes may be included in the BaseName._ Although there are variations per type of format, the link from the QR code, in this example, may be:

BaseName_LayerName_Version_Date.FormatExtension

In order to create a lookup table for the GIS and data files contained in the repository of the project or geographical area, the following steps may be taken: 1) the contents of the repository may first be ordered by Main Format, and their associated files, if any, 2) then, within each Main Format, they may be ordered alphabetically (e.g., from A to Z) by Type of Map using their Map Symbol, 3) when the main format requires associated files, they are ordered as a packet with the Main Format file, and 4) then they are ordered by Version and Date. This may result in Reference (LOOKUP TABLE QR GIS v.0.4.0.xlsx).

There are a variety of devices that can serve as the smartphone described herein. These may include, for example, smartphones and/or tablets that can capture QR codes and link to a URL. A few non-limiting examples include Apple iPhones and iPads running iOS11 or later, Android smartphones and tablets (some may require downloading a separate QR code scanning app from the Google Play Store, for example), and Samsung, Hiawei, Xiaomi have devices that often have a built-in QR code scanner accessible through the camera app or the native scanner app.

The phrase computer-aided design or the like should be construed broadly to include or involve any computer-based systems or techniques for designing, engineering, simulating, or viewing designs with one or more computers or computer-based components.

In various implementations, certain computer components disclosed herein (e.g., applications, design tools, etc.) can be implemented by one or more computer-based processors (referred to herein as a processor) executing computer-readable instructions stored on non-transitory computer-readable medium to perform the associated computer-based functionalities (e.g., the functionalities represented in the flowcharts and attributable to the computer). The one or more computer-based processors can be virtually any kind of computer-based processors and can be contained in one housing or distributed at different locations, and the non-transitory computer-readable medium can be or include any one or more of a variety of different computer-based hardware memory/storage devices either contained in one housing or distributed at different locations.

Certain functionalities are described herein as being accessible or activated by a user selecting an onscreen button or the like. This should be construed broadly to include any kind of visible, user-selectable element or other user interactive element.

The systems and techniques disclosed herein can be implemented in a number of different ways. In one exemplary implementation, the systems and techniques disclosed herein may be incorporated into the DraftSight® computer program from Dassault Systèmes Solidworks Corporation. In various implementations, the systems and techniques can be deployed otherwise.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., aspects of those represented in the flowcharts and attributable to the computer systems and/or components thereof) can be implemented as operations performed by a data processing apparatus (e.g., a processor/specially programmed processor/computer) on data stored on one or more computer-readable storage devices or received from other sources, such as the computer system and/or network environment described herein. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Some steps (e.g., 264 and/or 266) may happen at the smartphone or at a web server or other system location.

Finally, what follows is a discussion of some additional considerations, advantages, and details of certain implementations.

On a typical construction project, for example, team members designing and managing the project may represent approximately 15% of the workforce. These team members may create and edit CAD files, 3D models, 2D drawings and/or GIS maps. The drawings and maps they use are generally vector representations of data entities. They can be edited by CAD or GIS application software in their native vector format, such as DWG or Shapefile, or converted into another format. Some of the team members may create and manage GIS maps. Typically, about 85% of the team members constituting the workforce are being assigned tasks linked to their skills. They work onsite and in-field. They generally receive instructions and references through one or more rasterized 2D documents derived from CAD drawings and/or GIS maps. Some of these rasterized 2D drawings or maps also contain other data attributes. Other users of these documents may be clients, contractors, suppliers, and regulatory authorities.

Rasterized 2D drawings are generally used (and are intended to be used) as instructions, or as references to guide users through a task. They can be annotated but are generally not substantively modified, or edited, by the recipient (e.g., an end user). Rasterized 2D drawings and/or GIS maps may be images in formats such as JPEG, TIFF, PDF, and PNG. The images generally represent the original vector 2D CAD drawing, for example, from which they were generated. TIFF and PDF formats are lossless and universally supported for saving and storing large files. Rasterized 2D drawings containing other data such as schedules, notes and legends may be images of original 2D vector CAD drawings, for example. Similarly, GIS data may have vector entities and raster data such as, for example, grid-cells.

The number of rasterized drawings and/or maps used in a particular project or activity is typically many more times the number of 2D CAD drawings and/or GIS maps with digital entities used in that particular project or activity. This may be due to one or more of many potential root causes including, for example, considerations related to digital and print documents, legacy or existing drawings, non-technical users, visualization and communication, collaborative markup, and review, full size, and compatibility, etc. Each of these categories is discussed below in turn.

Digital and Print documents: Most companies want to move to digital. The problem is that today most of the onsite workers and in-field workers are still working with paper on rasterized images from CAD or GIS. Once the document is in paper form, it loses a connection with the original content.

Legacy or Existing Drawings: In some cases, projects/activities may involve working with older or existing drawings created in a raster format. These drawings may not have been originally created using CAD software, or the original CAD files may not be available. As a result, the project team may have to rely on image or hand-drawn versions of these drawings for reference or modification. There are several ways to reconstruct these files as 2D CAD drawings, either by software application when the rasterized 2D drawing exists, or by creating them by capturing the current state of the asset by photogrammetry or LIDAR, or in combination of both.

Non-Technical Users: Projects often involve various users who may not have technical expertise or access to CAD software. Rasterized 2D drawings, such as image files, are more accessible and easier to share with non-technical team members, clients, contractors, suppliers, and regulatory authorities. Rasterized 2D drawings can be viewed using widely available software, whereas CAD drawings require specialized software to be properly accessed and edited which is not accessible to many users.

Visualization and Communication: Rasterized drawings can be more visually appealing and easier to understand for certain purposes. They can convey design intent, aesthetic details, or graphic representations effectively and efficiently. CAD drawings, on the other hand, may be more technical in nature, representing precise measurements, dimensions, and specifications. Rasterized 2D drawings are used in presentations, marketing materials, or public communications where visual impact may be more important than technical accuracy. Reading and correctly interpreting 2D raster drawings still requires care. One interesting lesson is that in many countries where workers are barely literate or illiterate they still get, with practice, some correct understanding and interpretation of the image(s) in a 2D rasterized drawing.

Collaborative Markup and Review: Rasterized 2D drawings allow for easier annotation, markup, and review processes. Team members can add comments, highlights, or sketches directly on the drawings using various software tools. While CAD software also supports markups, they may require the recipients to have access to the same CAD software or require additional training to use the markup features effectively.

File Size and Compatibility: Rasterized 2D drawings tend to have smaller file sizes compared to CAD drawings, particularly for complex or large-scale projects. This makes them easier to handle, store, and share, especially in situations with limited bandwidth or when working with collaborators who have hardware or software limitations. Multiple team members using the same 2D rasterized drawing for instructions or reference: Different workers may work, synchronously or not, on the same rasterized 2D drawing, but at different locations depicted on the rasterized 2D drawing. Multiple users may also use the rasterized 2D drawing as a reference, illustration, and not as an instruction.

There are many reasons why multiple revisions of 2D CAD drawings and rasterized 2D drawings may come into being. One such reason is that a project may be subject to one or more change orders (e.g., in a construction project, or the like). On large projects and/or projects involving large assets, design changes can be frequent and the frequency of changes may increase the more complex a project is or becomes. Large-scale commercial buildings, infrastructure, plants, and shipbuilding, for example, tend to require more detailed and specialized drawings, which may lead to more need for change orders. This can be due, for example, to design errors, late improvements requested by or agreed to by owners, material substitution for shortages due to the supply chain problems, costs, potential delays, and/or increases in performance level of the quality or quantity of the initial output produced by the asset.

Design changes may arise during the design phase of a project, but also during the construction phase of a project, which can seriously impact the number of 2D CAD drawing changes that may be needed, for example. These can arise due to owners' requests, engineering requirements, site constraints, and/or regulatory conditions that arise during the construction phase. They may happen in any one of a variety of different trade skill areas such as architectural, structural, mechanical, plumbing and safety.

Additionally, design processes are sometimes iterative with multiple revisions and refinements as the design evolves during design or construction. An initial project contract may be amended by change orders. Some types of change orders involve changes in the scope of a project (e.g., the owner or the tenant agency requests a design change), the arising of unforeseen conditions (e.g., site conditions differ from expected, and/or subcontractor or contractor requires changes), professional errors and omissions (where, e.g., a contractor or subcontractor request changes), other errors (e.g., errors in construction design plans and specification), and/or other omissions (e.g., omission of an item or element from the plan).

In the US residential construction industry, for example, the number of change orders (CO) and the average change value tends to vary with contract size. Change orders in the US represented approximately 5% of the original contract for residential buildings in 2020. The amounts tends to vary per region, with coastal areas tending to have higher prices, and a larger total of change order amounts. The potential for upside in implementing these techniques is large.

Other implementations are within the scope of the claims.

What is claimed is:

1. A computer-based method comprising:

capturing an image of a non-alphanumeric code from a printed rendition of a document that includes substantive information that is subject to change over time with a smart device, wherein the non-alphanumeric code encodes a document identifier that identifies the document, a version identifier that identifies a version of the document represented by the printed rendition of the document, and a uniform resource locator (URL) for a remote network location where information about a latest version of the document is stored;

storing, at the remote network location defined by the URL, the information about the latest version of the document, wherein the information about the latest version of the document comprises:

a digital copy of the latest version of the document in a drawings repository that contains digital copies of latest versions of several documents; and searchable metadata relating to the latest version of the document in a lookup table that contains searchable metadata relating to the latest versions of several documents;

initiating a request from the smart device, in response to the capturing of the image of the non-alphanumeric code from the printed rendition of the document, to determine, from the information about the latest version of the document, including the searchable metadata relating to the latest version of the document in the lookup table, at the remote network location defined by the URL, whether the printed rendition of the document whose non-alphanumeric code was captured is the latest version of the document;

determining, in response to the request and based on the information stored at the remote network location defined by the URL, whether the printed rendition of the document represents the latest version of the document;

if the determination reveals that the printed rendition of the document represents the latest version of the document:

receiving a response from a server at the remote network location indicating that the printed rendition of the document whose non-alphanumeric code was captured represents the latest version of the document; and producing a notification on a display screen of the smart device that indicates the document whose non-alphanumeric code was captured in the image is the latest version of the document;

if the determination reveals that the printed rendition of the document does not represent the latest version of the document:

receiving, at the smart device, the latest version of the document in electronic form, from the drawings repository at the remote network location defined by the URL if the determination reveals that the printed rendition of the document whose non-alphanumeric code was read by the code reader is not the latest version of the document; and rendering the latest version of the document for viewing on a display screen of the smart device.

2. The computer-based method of claim 1, wherein the drawings repository contains an initial version of the document and one or more revisions of the document; and wherein the lookup table contains an array or matrix of metadata about the initial version of the document and the one or more revisions of the document stored in computer memory in a manner that is searchable.

3. The computer-based method of claim 2 further comprising:

populating the drawings repository with at least the initial version of the document; and populating the lookup table with metadata about at least the initial version of the document from one or more computer workstations prior to performing the steps in claim 1.

4. The computer-based method of claim 3, further comprising:

applying a unique non-alphanumeric code to each respective version of the document created at the one or more computer workstations.

5. The computer-based method of claim 4, further comprising:

generating each unique non-alphanumeric code with a quick response (QR) code generator.

6. The computer-based method of claim 5, wherein generating each unique non-alphanumeric code with the QR code generator comprises:

inputting to the QR code generator:

a document identifier that identifies a corresponding one of the documents and a version represented by that document, and a URL for a remote network location where information about that document and versions thereof, if any, is to be stored.

7. The computer-based method of claim 1, wherein the document with the non-alphanumeric code comprises a real-world physical substrate.

8. The computer-based method of claim 7, wherein capturing the non-alphanumeric code from the document comprises directing a camera of the smart device to focus on the non-alphanumeric code on the non-alphanumeric code on the real-world physical substrate and activating a web browser in the smart device to navigate to the remote network location across a network.

9. The computer-based method of claim 1, wherein the document with the non-alphanumeric code is in an electronic form.

10. The computer-based method of claim 9, wherein capturing the image of the non-alphanumeric code from the document comprises causing the non-alphanumeric code on the document to appear on the display screen of the smart device and activating a web browser in the smart device to navigate to the remote network location across a network.

11. The computer-based method of claim 1, wherein the smart device comprises:

a housing;

a camera coupled to the housing, a display screen;

a reader for capturing the image of the non-alphanumeric code; and a web browser.

12. The computer-based method of claim 1, wherein the non-alphanumeric code is a quick response (QR) code.

13. The computer-based method of claim 1, wherein the document is a rasterized 2D drawing or a geographic information systems (GIS) map and related data files.

14. The computer-based method of claim 1 wherein the image is captured with a camera integrated into the smart device.

15. The computer-based method of claim 1, further comprising reading the non-alphanumeric code from the document with a code reader integrated into the smart device.

16. The computer-based method of claim 1, further comprising reading the non-alphanumeric code from the document with a code reader.

17. The computer-based method of claim 1, further comprising:

upon receipt of the request at the remote network location, checking whether the document is a single self-contained document or part of a packet of documents to be interpreted concurrently.

18. The computer-based method of claim 1, further comprising:

storing, at the remote network location defined by the URL, information about the document and versions thereof, if any, wherein storing the information about the document and versions thereof, if any, comprises:

storing a drawings repository that contains an initial version of the document and one or more revisions of the document, and storing a lookup table that contains an array or matrix of metadata about the initial version of the document and the one or more revisions of the document in computer memory in a manner that is searchable, wherein each document in the drawings repository is stored in logical association with a corresponding file name that identifies a subject matter of that particular document, revision information of that particular document, and a revision date for that particular document.

19. The computer-based method of claim 1, further comprising:

in response to the computer determination that the printed rendition of the document whose non-alphanumeric code was captured is not the latest version of the document, displaying, at a display screen of the smart device, a user-selectable hyperlink, the selection of which by the user causes a website associated with the hyperlink to provide access to the latest version of the document.

20. The computer-based method of claim 1, wherein capturing the image of the non-alphanumeric code from the document comprises taking a photograph of a paper version of the document at a worksite associated with the substantive information on the document, using a camera of the smart device, and wherein the drawings repository is stored at a remote network location accessible by the smart device via a network.

21. The computer-based method of claim 1, wherein the searchable metadata in the lookup table relates to the latest one and only one version of every one of the documents stored in the drawings repository.

22. A computer-based method comprising:

generating a unique non-alphanumeric code with a quick response (QR) code generator, wherein generating the unique non-alphanumeric code with the QR code generator comprises:

inputting to the QR code generator:

a document identifier that identifies a document and a version identifier associated with the document, and a URL for a remote network location where information about the document, including version information for the document, is to be stored;

generating a printed rendition of the document that includes the unique non-alphanumeric code;

capturing an image of the non-alphanumeric code from the printed rendition of a document that includes substantive information that is subject to change over time with a smart device, wherein the non-alphanumeric code encodes a document identifier that identifies the document, a version identifier that identifies a version of the document represented by the printed rendition of the document, and a uniform resource locator (URL) for a remote network location where information about a latest version of the document is stored;

storing, at the remote network location defined by the URL, the information about the latest version of the document, wherein the information about the latest version of the document comprises:

a digital copy of the latest version of the document in a drawings repository that contains digital copies of latest versions of several documents; and searchable metadata relating to the latest version of the document in a lookup table that contains searchable metadata relating to the latest version of the document and searchable metadata relating to the latest versions of the other documents;

initiating a request from the smart device, in response to the capturing of the image of the non-alphanumeric code from the printed rendition of the document, to determine, from the information about the latest version of the document, including the searchable metadata relating to the latest version of the document in the lookup table, at the remote network location defined by the URL whether the printed rendition of the document whose non-alphanumeric code was captured is the latest version of the document;

determining, in response to the request and based on the information stored at the remote network location defined by the URL, whether the printed rendition of the document represents the latest version of the document;

if the determination reveals that the printed rendition of the document represents the latest version of the document:

receiving a response from a server at the remote network location indicating that the printed rendition of the document whose non-alphanumeric code was captured represents the latest version of the document; and producing a notification on a display screen of the smart device that indicates the document whose non-alphanumeric code was captured in the image is the latest version of the document; and if the determination reveals that the printed rendition of the document does not represent the latest version of the document:

receiving, at the smart device, the latest version of the document in electronic form, from the drawings repository at the remote network location defined by the URL if the determination reveals that the printed rendition of the document whose non-alphanumeric code was read by the code reader is not the latest version of the document; and rendering the latest version of the document for viewing on a display screen of the smart device, wherein the document is a rasterized 2D drawing or a geographic information systems (GIS) map and related data files, and wherein the searchable metadata in the lookup table relates to the latest one and only one version of every one of the documents stored in the drawings repository.

* * * * *